US010902331B2

(12) United States Patent
Delgado et al.

(10) Patent No.: US 10,902,331 B2
(45) Date of Patent: Jan. 26, 2021

(54) SYSTEMS AND METHODS FOR PROVIDING VISUAL ALLOCATION MANAGEMENT

(71) Applicant: Massachusetts Institute of Technology, Cambridge, MA (US)

(72) Inventors: Andres Mauricio Munoz Delgado, England (GB); Bryan L. Reimer, Newton, MA (US); Joonbum Lee, Seattle, WA (US); Linda Sala Angell, Grosse Pointe Farms, MI (US); Bobbie Danielle Seppelt, Brookline, MA (US); Bruce L. Mehler, Jamaica Plain, MA (US); Joseph F. Coughlin, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 635 days.

(21) Appl. No.: 15/682,108

(22) Filed: Aug. 21, 2017

(65) Prior Publication Data

US 2018/0053103 A1 Feb. 22, 2018

Related U.S. Application Data

(60) Provisional application No. 62/377,213, filed on Aug. 19, 2016.

(51) Int. Cl.
*G06N 5/04* (2006.01)
*G06N 20/00* (2019.01)
(Continued)

(52) U.S. Cl.
CPC .......... *G06N 5/04* (2013.01); *G06K 9/00604* (2013.01); *G06K 9/00845* (2013.01);
(Continued)

(58) Field of Classification Search
CPC .......... G06N 5/04; G06N 20/00; G06N 7/005; G06K 9/6297; G06K 9/00845
See application file for complete search history.

(56) References Cited

U.S. PATENT DOCUMENTS

| 5,465,079 A | 11/1995 | Bouchard et al. |
| 6,724,920 B1 * | 4/2004 | Berenz ............... G06K 9/00221 |
| | | 180/169 |

(Continued)

FOREIGN PATENT DOCUMENTS

| EP | 1 512 584 A1 | 3/2005 |
| JP | 2002-331850 A | 11/2002 |

(Continued)

OTHER PUBLICATIONS

Yamato, J., et al., Recognizing human action in time-sequential images using hidden markov model. Proceedings of 1992 IEEE Computer Society Conference on Computer Vision and Pattern Recognition (CVPR '92), Champaign, Illinois, Jun. 15-18, 1992, pp. 379-385.

(Continued)

*Primary Examiner* — Phenuel S Salomon
(74) *Attorney, Agent, or Firm* — Nutter McClennen & Fish LLP

(57) ABSTRACT

Systems and methods for managing visual allocation are provided herein that use models to determine states based on visual data and, based thereon, output feedback based on the determined states. Visual data is initially obtained by a visual allocation management system. The visual data includes eye image sequences of a person in a particular state, such as engaging in a task or activity. Visual features can be identified from the visual data, such that glance information including direction and duration can be calculated. The visual data, information derived therefrom, and/or other contextual data is input into the models, which corre- (Continued)

spond to states, to calculate probabilities that the particular state that the person is engaged in is one of the modeled states. Based on the state identified as having the highest probability, an optimal feedback, such as a warning or instruction, can be output to a connected devices, systems, or objects.

29 Claims, 11 Drawing Sheets

(51) Int. Cl.
    *G06K 9/62* (2006.01)
    *G06K 9/00* (2006.01)
    *G06N 7/00* (2006.01)

(52) U.S. Cl.
    CPC .......... *G06K 9/6297* (2013.01); *G06N 7/005* (2013.01); *G06N 20/00* (2019.01)

(56) References Cited

U.S. PATENT DOCUMENTS

| | | | |
|---|---|---|---|
| 6,879,969 B2 | 4/2005 | Engstrom et al. | |
| 6,882,906 B2 | 4/2005 | Geisler et al. | |
| 6,892,116 B2 | 5/2005 | Geisler et al. | |
| 6,950,027 B2 | 9/2005 | Banas | |
| 6,974,414 B2 | 12/2005 | Victor | |
| 6,995,663 B2 | 2/2006 | Geisler et al. | |
| 6,998,972 B2 | 2/2006 | Geisler et al. | |
| 7,027,631 B2* | 4/2006 | Takeo | G06T 7/0012 378/207 |
| 7,098,891 B1* | 8/2006 | Pryor | G06F 3/011 345/158 |
| 7,363,233 B1* | 4/2008 | Levine | G06Q 10/04 705/1.1 |
| 7,375,728 B2* | 5/2008 | Donath | B60R 1/00 345/427 |
| 7,394,393 B2 | 7/2008 | Zhang et al. | |
| 7,423,540 B2 | 9/2008 | Kisacanin | |
| 7,428,449 B2 | 9/2008 | Fehr et al. | |
| 7,444,311 B2 | 10/2008 | Engstrom et al. | |
| 7,455,405 B2 | 11/2008 | Victor et al. | |
| 7,460,940 B2 | 12/2008 | Larsson et al. | |
| 7,463,157 B2 | 12/2008 | Victor et al. | |
| 7,463,961 B2 | 12/2008 | Powers et al. | |
| 7,468,673 B2 | 12/2008 | Sultan et al. | |
| 7,532,958 B2 | 5/2009 | Powers et al. | |
| 7,639,148 B2 | 12/2009 | Victor | |
| 7,656,313 B2 | 2/2010 | Victor et al. | |
| 7,777,619 B2 | 8/2010 | Yopp et al. | |
| 7,880,621 B2 | 2/2011 | Kalik | |
| 7,894,953 B2 | 2/2011 | Geisler et al. | |
| 7,912,796 B2 | 3/2011 | Engstrom et al. | |
| 8,487,775 B2 | 7/2013 | Victor et al. | |
| 8,497,880 B2 | 7/2013 | Victor et al. | |
| 8,749,350 B2 | 6/2014 | Geisler et al. | |
| 8,994,522 B2 | 3/2015 | Tengler et al. | |
| 9,101,313 B2 | 8/2015 | Levin et al. | |
| 9,213,522 B2 | 12/2015 | Prakah-Asante et al. | |
| 9,251,704 B2 | 2/2016 | Tzirkel-Hancock et al. | |
| 9,376,018 B2 | 6/2016 | Aryal et al. | |
| 9,852,625 B2 | 12/2017 | Victor et al. | |
| 2004/0178890 A1* | 9/2004 | Williams | B60Q 1/52 340/425.5 |
| 2005/0073136 A1* | 4/2005 | Larsson | A61B 5/163 280/735 |
| 2007/0244606 A1 | 10/2007 | Zhang et al. | |
| 2007/0296601 A1 | 12/2007 | Sultan et al. | |
| 2008/0143504 A1 | 6/2008 | Martin Alvarez | |
| 2010/0033333 A1* | 2/2010 | Victor | A61B 5/1114 340/576 |
| 2010/0102988 A1 | 4/2010 | Chen | |
| 2014/0347458 A1 | 11/2014 | Tijerina et al. | |
| 2015/0258996 A1 | 9/2015 | Victor et al. | |
| 2016/0027278 A1* | 1/2016 | McIntosh | G08B 21/0423 715/741 |
| 2018/0072327 A1 | 3/2018 | Seppelt et al. | |

FOREIGN PATENT DOCUMENTS

| | | | |
|---|---|---|---|
| JP | 2002331850 A * | 11/2002 | ......... G06K 9/00845 |
| WO | 2008/018991 A3 | 10/2008 | |

OTHER PUBLICATIONS

Mehler, B., et al., Further evaluation of the effects of a production level "voice-command" interface on driver behavior: Replication and a consideration of the significance of training method. MIT AgeLab Technical Report No. 2014-2, Massachusetts Institute of Technology, Cambridge, MA, Jul. 9, 2014, 191 Pages.

Mehler, B., et al., Multi-modal assessment of on-road demand of voice and manual phone calling and voice navigation entry across two embedded vehicle systems. Ergonomics. Mar. 2006;59(3):344-67. doi: 10.1080/00140139.2015.1081412. Epub Oct. 12, 2015.

Mehler, B., et al., Additional Findings on the Multi-Modal Demands of "Voice-Command" Interfaces. Paper No. 2016-01-1428, SAE Technical Paper, Society for Automotive Engineers (SAE), SAE 2016 World Congress and Exhibition, Apr. 5, 2016, 20 pages, doi:10.4271/2016-01-1428.

Mendoza, M.Á, et al., HMM-Based Action Recognition Using Contour Histograms. Proceedings of the 3rd Iberian Conference on Pattern Recognition and Image Analysis (IbPRIA'07), Girona, Spain, Jun. 6-8, 2007, pp. 394-401, Springer Berlin Heidelberg.

Metzler, D., et al., A Markov random field model for term dependencies. Proceedings of the 28th Annual International ACM SIGIR Conference on Research and Development in Information Retrieval (SIGIR '05), Salvador, Brazil, Aug. 15-19, 2005, pp. 472-479, ACM.

Michon, J.A., A critical view of driver behavior models: what do we know, what should we do? Human Behavior and Traffic Safety, L. Evans, et al., eds., 1985, pp. 485-520, Plenum Press, New York, NY.

Mitrovic, D., Machine learning for car navigation. Proceedings of the 14th International Conference on Industrial and Engineering Applications of Artificial Intelligence and Expert Systems (IEA/AIE'01): Engineering of Intelligent Systems, Jun. 4-7, 2001, pp. 670-675, Springer-Verlag, London, UK.

Mitrovic, D., Reliable method for driving events recognition. IEEE Transactions on Intelligent Transportation Systems, IEEE, Jun. 2005;6(2):198-205, XP011133324, doi: 10.1109/TITS.2005.848367.

Müller, M., Dynamic time warping. Information Retrieval for Music and Motion, 2007, pp. 69-84, Chapter 4, Springer Berlin Heidelberg.

Munger, D., et al., A simulation study examining smartphone destination entry while driving. Proceedings of the 6th International Conference on Automotive User Interfaces and Interactive Vehicular Applications (AutomotiveUI '14), Seattle, Washington, Sep. 17-19, 2014, 5 Pages, ACM.

Muñoz, M., et al., Exploring new qualitative methods to support a quantitative analysis of glance behavior. Proceedings of the 7th International Conference on Automotive User Interfaces and Interactive Vehicular Applications (AutomotiveUI '15), Nottingham, United Kingdom, Sep. 1-3, 2015, pp. 125-132.

Muñoz, M., et al., Distinguishing patterns in drivers' visual attention allocation using Hidden Markov Models. Transportation Research Part F: Traffic Psychology and Behavior, vol. 43, Nov. 2016, pp. 90-103.

Nunes, L., et al.,, Cognitive demands of hands-free-phone conversation while driving. Transportation Research Part F: Traffic Psychology and Behavior, Jun. 2002;5(2):133-144.

Oiver, N., et al., Driver behavior recognition and prediction in a SmartCar. Proceedings of SPIE, Enhanced and Synthetic Vision, 2000, vol. 4023, pp. 280-290.

Oliver, N., et al., Graphical models for driver behavior recognition in a smartcar. Proceedings of the IEEE Intelligent Vehicles Symposium (IV 2000), Dearborn, MI, Oct. 5, 2000, pp. 7-12, IEEE.

(56) References Cited

OTHER PUBLICATIONS

Olson, R.L., et al., Driver Distraction in Commercial Vehicle Operations. U.S. Department of Transportation, Federal Motor Carrier Safety Administration (FMCSA), FMCSA-RRR-09-042, Sep. 2009, 285 Pages.

Pentland, A., et al., Modeling and prediction of human behavior. Neural Comput. Jan. 1, 1991;11(1):229-42.

Pohl, J., et al., A driver-distraction-based lane-keeping assistance system. Proceeding of the Institution of Mechanical Engineers, Part I: Journal of Systems and Control Engineering (JSCE218), Jun. 1, 2007;221(4):541-552.

Pradhan, A.K., et al., Using eye movements to evaluate effects of driver age on risk perception in a driving simulator. Human Factors, Winter, 2005;47(4):840-852.

Qian, H., et al., Support vector machine for behavior-based driver identification system. Journal of Robotics, Hindawi Publishing Corporation, 2010, vol. 2010, Article ID 397865, 11 Pages, doi:10.1155/2010/397865.

Rabiner, L.R., A tutorial on hidden Markov models and selected applications in speech recognition. Proceedings of the IEEE, Feb. 1989, vol. 77, Issue 2, pp. 257-286.

Reimer, B., et al., A field study on the impact of variations in short-term memory demands on drivers' visual attention and driving performance across three age groups. Hum Factors. Jun. 2012;54(3):454-68.

Reimer, B., et al., The Effects of a Production Level "Voice-Command" Interface on Driver Behavior: Reported Workload, Physiology, Visual Attention, and Driving Performance. MIT AgeLab Technical Report No. 2013-17A, Massachusetts Institute of Technology, Cambridge, MA, 2013, 152 Pages.

Reimer, B., et al., The Effects of a Production Level "Voice-Command" Interface on Driver Behavior: Summary Findings on Reported Workload, Physiology, Visual Attention, and Driving Performance. MIT AgeLab Technical Report No. 2013-18A, White Paper, Massachusetts Institute of Technology, Cambridge, MA, Nov. 18, 2013, 19 Pages.

Reimer, B., et al., Effects of an 'expert mode' voice command system on task performance, glance behavior & driver physiology. Proceedings of the 6th International Conference on Automotive User Interfaces and Interactive Vehicular Applications (AutomotiveUI '14), Seattle, WA, Sep. 17-19, 9 Pages, 2014, DOI: 10.1145/2667317.2667320.

Reimer, B., et al., MIT AgeLab Video Annotator, Massachusetts Institute of Technology, Cambridge, MA, 2014, 9 Pages. Retrieved on May 11, 2018 from <https://bitbucket.org/agelab/annotator/>.

Reimer, B., et al., Multi-Modal Demands of a Smartphone Used to Place Calls and Enter Addresses during Highway Driving Relative to Two Embedded Systems. Insurance Institute for Highway Safety (IIHS), Arlington, VA, Mar. 2015, 35 Pages.

Sawyer, B.D., et al., Google glass: a driver distraction cause or cure? Hum Factors. Nov. 2014;56(7):1307-21.

Seaman, S., et al., It's all in the timing: Using the AttenD algorithm to assess texting in the nest naturalistic driving database. 9th International Driving Symposium on Human Factors in Driver Assessment, Training and Vehicle Design, Jun. 2017, 7 pages.

Seppelt, B., et al., Differentiating cognitive load using a modified version of AttenD. Proceedings of the 9th International ACM Conference on Automotive User Interfaces and Interactive Vehicular Applications (AutomotiveUI'17), Oldenburg, Germany, Sep. 24-27, 2017, pp. 114-122.

Seppelt, B.D., et al., Glass half-full: On-road glance metrics differentiate crashes from near-crashes in the 100-car data. Accident Analysis & Prevention, vol. 107, Oct. 2017, pp. 48-62.

Shutko, J., et al., Driver workload effects of cell phone, music player, and text messaging tasks with the Ford SYNC voice interface versus handheld visual-manual interfaces. Paper No. 2009-01-0786, SAE Technical Paper, SAE International, Society of Automotive Engineers (SAE) World Congress & Exhibition, 2009, 9 Pages.

Smith, D., et al., Methodology for Capturing Driver Eye Glance Behavior During In-Vehicle Secondary Tasks. Transportation Research Record: Journal of the Transportation Research Board, vol. 1937, 2005, pp. 61-65.

Sodhi, M., et al., Glance analysis of driver eye movements to evaluate distraction. Behav Res Methods Instrum Comput. Nov. 2002;34(4):529-38.

Solovey, E.T., et al., Classifying driver workload using physiological and driving performance data: Two field studies. Proceedings of the SIGCHI Conference on Human Factors in Computing Systems (CHI '14), Toronto, Ontario, Canada, Apr. 26-May 1, 2014, pp. 4057-4066, ACM.

Strayer, D.L., et al., Measuring cognitive distraction in the automobile. AAA Foundation for Traffic Safety, Washington, D.C., Jun. 2013, 53 Pages.

Strayer, D.L., et al., Measuring cognitive distraction in the automobile II: Assessing in-vehicle voice-based interactive technologies. AAA Foundation for Traffic Safety, Washington, D.C., Oct. 2014, 44 Pages.

Tango, F., et al., Non-intrusive detection of driver distraction using machine learning algorithms. 19th European Conference on Artificial Intelligence (ECAI'10), Aug. 16-20, 2010, Libson, Portugual, Coelho, et al., eds., IOS Press, Section 1F, Leanring-Based Applications, pp. 157-162.

Tango, F., et al., Real-time detection system of driver distraction using machine teaming. IEEE Transactions on Intelligent Transportation Systems, Jun. 2013;14(2):894-905.

Tchankue, P., et al., Using machine learning to predict the driving context whilst driving. Proceedings of the South African Institute for Computer Scientists and Information Technologists Conference (SAICSIT '13), East London, South Africa, Oct. 7-9, 2013, pp. 47-55, ACM.

Thorslund, B., et al., Cognitive workload and visual behavior in elderly drivers with hearing loss. Eur Transp Res Rev, 2014;6(4):377-385, doi: 10.1007/s12544-014-0139-z.

Tijerina, L., Driver eye glance behavior during car following on the road. Paper No. 1999-01-1300, SAE Technical Paper, SAE International, Society of Automotive Engineers (SAE), International Congress and Exposition, Detroit, Michigan, Mar. 1-4, 1999, 17 Pages.

Tijerina, L., et al., Driver eye glance behavior during car following. U.S. Department of Transportation, National Highway Traffic Safety Administration (NHTSA), DOT HS 809 723, Apr. 2004, 40 Pages.

Tivesten, E., et al., Driving context and visual-manual phone tasks influence glance behavior in naturalistic driving. Transportation Research Part F: Traffic Physchology and Behavior, vol. 26, Part A, Sep. 2014, pp. 258-272.

Tsimhoni, O., et al., Effects of visual demand and in-vehicle task complexity on driving and task performance as assessed by visual occlusion. The University of Michigan Transportation Research Institute (UMTRI), Technical Report No. UMTRI-99-37, Dec. 1999, 78 Pages.

Victor, T., Keeping eye and mind on the road. Uppsala University, Digital Comprehensive Summaries of Uppsala Dissertations from the Faculty of Social Sciences 9, Department of Psychology, Doctoral Thesis, 2005, 84 Pages.

Victor, T., et al., Analysis of naturalistic driving study data: Safer glances, driver inattention, and crash risk. Strategic Highway Research Program (SHRP), SHRP 2 Safety Project S08A, Transportation Research Board of the National Academies, National Academy of Sciences, 2014, 191 Pages.

Wang, Y., et al., The sensitivity of different methodologies for characterizing drivers' gaze concentration under increased cognitive demand. Transportation Research Part F: Traffic Psychology and Behavior, Sep. 2014, vol. 26, Part A, pp. 227-237.

Wierwille, W.W., et al., Visual attentional demand of an in-car navigation display system. Vision in Vehicles—II, Proceedings of the Second International Conference on Vision in Vehicles, Nottingham, U.K., Sep. 14-17, 1987, pp. 307-316. Published in 1988.

Wierwille, W.W., et al., Modelling the relationship between driver in-vehicle visual demands and accident occurrence. Vision in Vehicles—VI, 1998;6:233-43.

(56) References Cited

OTHER PUBLICATIONS

[No Author Listed] Statement of principles, criteria and verification procedures on driver interactions with advanced in-vehicle information and communication systems. Driver Focus-Telematics Working Group, Jun. 17, 2003, Draft Version 3.0, Alliance of Automobile Manufacturers, Washington, D.C., 67 Pages.

[No Author Listed] Statement of principles, criteria and verification procedures on driver interactions with advanced in-vehicle information and communication systems. Driver Focus-Telematics Working Group, Jun. 26, 2006, Alliance of Automobile Manufacturers, Washington, D.C., 90 Pages.

[No Author Listed] Visual-Manual NHTSA Driver Distraction Guidelines for In-Vehicle Electronic Devices. U.S. Department of Transportation, National Highway Traffic Safety Administration (NHTSA), NHTSA-2010-0053, Apr. 26, 2013, 283 Pages.

[No Author Listed] Voice Recognition Installed in More than Half of New Cars by 2019. IHS Markit, IHS, Inc., Mar. 19, 2013, 2 Pages. Retrieved on May 10, 2018 from <http://technology.ihs.com/427146>.

Ahlstrom, C., et al., Bicyclists' visual strategies when conducting self-paced vs. system-paced smartphone tasks in traffic. Transportation Research Part F: Traffic Psychology and Behavior, vol. 41, Part B, Aug. 2016, pp. 204-216, Available online Feb. 24, 2015, doi:http://dx.doi.org/10.1016/j.trf.2015.01.010.

Alexandre, L.A., et al., On combining classifiers using sum and product rules. Pattern Recognition Letters, Oct. 2001;22(12):1283-1289.

Avilé-Arriaga, H.H., et al., A Comparison of Dynamic Naive Bayesian Classifiers and Hidden Markov Models for Gesture Recognition. Journal of Applied Research and Technology, Apr. 2011;9(1):81-102.

Bach, K.M., et al., Interacting with in-vehicle systems: Understanding, measuring, and evaluating attention. Proceedings of the 23rd British HCI Group Annual Conference on People and Computers: Celebtrating People and Technology (BCS-HCI '09), British Computer Society, Cambridge, United Kingdom, Sep. 1-5, 2009, pp. 453-462.

Banko, M., et al., Scaling to very very large corpora for natural language disambiguation. Proceedings of the 39th Annual Meeting on Association for Computational Linguistics (ACL '01), Toulouse France, Jul. 6-11, 2001, pp. 26-33.

Beckers, N., et al., Comparing the demands of destination entry using Google Glass and the Samsung Galaxy S4. Proceedings of the Human Factors and Ergonomics Society Annual Meeting, Sep. 1, 2014, vol. 58, Issue 1, pp. 2156-2160.

Birrell, S.A., et al., Glance behaviours when using an in-vehicle smart driving aid: A real-world, on-road driving study. Transportation Research Part F: Traffic Psychology and Behaviour, Jan. 2014, vol. 22, pp. 113-125.

Bonomi, F., The Smart and Connected Vehicle and the Internet of Things. Cisco Systems, Advanced Architecture and Research, Workshop on Synchronization and Timing Systems 2013 (WSTS 2013), San Jose, CA, 2013, 53 Pages, PowerPoint Presentation.

Chandrasiri, N.P., et al., Driving skill analysis using machine learning: The full curve and curve segmented cases. 2012 12th International Conference on ITS Telecommunications (ITST '12), Taipei, Taiwan, Nov. 5-8, 2012, pp. 542-547.

Chandrasiri, N.P., et al., Driving skill classification in curve driving scenes using machine learning. J Mod Transport, 2016;24(3):196-206.

Chiang, D.P., et al., On the highway measures of driver glance behavior with an example automobile navigation system. Appl Ergon. May 2004;35(3):215-23.

Chiang, D.P., et al., Comparison of visual-manual and voice interaction with contemporary navigation system HMIs. Paper No. 2005-01-0433, SAE Technical Paper, Society of Automotive Engineers (SAE), 2005 SAE World Congress, Detroit, Michigan, Apr. 11-14, 2005, 10 Pages.

Chong, L., et al., A rule-based neural network approach to model driver naturalistic behavior in traffic. Transportation Research Part C: Emerging Technologies, vol. 32, Jul. 2013, pp. 207-223.

Donmez, B., et al., Differences in off-road glances: Effects on young drivers' performance. J Transp Eng, May 2010;136(5):403-409.

Engström, J., et al., Effects of visual and cognitive load in real and simulated motorway driving. Transportation research Part F: Traffic Psychology and Behaviour, Mar. 2005;8(2):97-120.

Fisher, D.L., et al., Can novice drivers be trained to scan for information that will reduce their likelihood of a crash? Inj Prev. Jun. 2006;12 Suppl 1:i25-9.

Fitch, G.M., et al., The impact of hand-held and hands-free cell phone use on driving performance and safety-critical event risk. U.S. Department of Transportation, National Highway Traffic Safety Administration (NHTSA), DOT HS 811 757, Apr. 2013, 273 Pages.

Fridman, L., et al., Driver Gaze Region Estimation without Use of Eye Movement. IEEE Intelligent Systems, vol. 31, Issue 3, pp. 49-56, 2016.

Fridman L., et al., "Owl" and "Lizard": Patterns of Head Pose and Eye Pose in Driver Gaze Classification. Accepted for Publication in IET Computer Vision, Electronically Published Aug. 2015, 9 Pages.

Fridman, L., et al., What can be predicted from six seconds of driver glances? Proceedings of the 2017 CHI Conference on Human Factors in Computing Systems (CHI '17), ACM Press, Denver, Colorado, May 6-11, 2017, pp. 2805-2813, XP058337996, doi: 10.1145/3025453.3025929.

Ghahramani, Z., et al., Factorial hidden markov models. Machine Learning, 1997;29(2-3):245-273.

Gotz, D., et al., Behavior-driven visualization recommendation. Proceedings of the 14th International Conference on Intelligent User Interfaces (IUI '09), ACM, Sanibel Island, Florida, Feb. 8-11, 2009, pp. 315-324.

Green, P., Visual and task demands of driver information systems, The University of Michigan Transportation Research Institute (UMTRI), Technical Report No. UMTRI-98-16, Jun. 1999, 120 Pages.

Haigney, D.E., et al., Concurrent mobile (cellular) phone use and driving performance: task demand characteristics and compensatory processes. Transportation Research Part F: Traffic Psychology and Behaviour, Sep. 2000;3(3):113-121.

Harbluk, J.L., et al., An on-road assessment of cognitive distraction: Impacts on drivers' visual behavior and braking performance. Accid Anal Prev, Mar. 2007;39(2):372-9. Epub Oct. 19, 2006.

He, F., et al., Improving naive bayes text classifier using smoothing methods. Proceedings of the 29th European Conference on Information Retrieval Research (ECIR 2007), Rome, Italy, Apr. 2-5, 2007, In Advances in Information Retrieval, LNCS 4425, Amati, et al., eds., pp. 703-707, Springer Berlin Heidelberg.

He, J., et al., Texting While Driving: Is Speech-Based Texting Less Risky than Handheld Texting? Proceedings of the 5th International Conference on Automotive User Interfaces and Interactive Vehicular Applications (AutomotiveUI, 13), Oct. 28-30, 2013, Eindhoven, The Netherlands, pp. 124-130.

He, L., et al., Driving intention recognition and behaviour prediction based on a double-layer hidden Markov model. Journal of Zhejiang University—SCIENCE C (Computers & Electronics), Mar. 2012;13(3):208-217.

International Search Report and Written Opinion for Application No. PCT/US2017/047837, dated Nov. 27, 2017 (14 Pages).

Ji, X., et al., Hidden markov model-based human action recognition using mixed features. J Comput Inf Syst, 2013, vol. 9, pp. 3659-3666.

Just, M.A., et al., A decrease in brain activation associated with driving when listening to someone speak. Brain Res. Apr. 18, 2008;1205:70-80. doi: 10.1016/j.brainres.2007.12.075. Epub Feb. 19, 2008.

Keim, D.A, Information visualization and visual data mining. IEEE Transactions on Visualization and Computer Graphics, IEEE, Jan.-Mar. 2002, vol. 7, Issue 1, pp. 100-107.

Khaisongkram, W., et al., Automobile Driving Behavior Recognition Using Boosting Sequential Labeling Method for Adaptive Driver Assistance Systems. Proceedings of 31st Annual German Conference on AI (KI 2008), Kaiserlautern, Germany, Sep. 23-26,

(56) References Cited

OTHER PUBLICATIONS

2008. In KI 2008: Advances in Artificial Intelligence, LNAI 5243, pp. 103-110, A.R. Dengel, et al., eds., Springer Berlin Heidelberg.

Kircher, K., et al., Issues related to the driver distraction detection algorithm AttenD. First International Conference on Driver Distraction and Inattention (DDI 2009), Sep. 28-29, 2009, Gothenburg, Sweden, 15 pages.

Klauer, S.G., et al., Distracted driving and risk of road crashes among novice and experienced drivers. N Engl J Med. Jan. 2, 2014;370(1):54-9. doi: 10.1056/NEJMsa1204142.

Krumm, J., A Markov Model for Driver Turn Prediction. Paper No. 2008-01-0195, SAE Technical Paper, Society of Automotive Engineers (SAE) 2008 World Congress, Apr. 14-17, 2008, Detroit, MI, 7 Pages.

Kuge, N., et al., A driver behavior recognition method based on a driver model framework. Paper No. 2000-01-0349, SAE Technical Paper, Society for Automotive Engineers (SAE) 2000 World Congress, 2000, 8 Pages.

Kumagai, T., et al., Prediction of Driving Behavior through Probabilistic Inference. Proceedings of the Eigth International Conference on Engineering Applications of Neural Networks (EANN'03), Torremolinos, Malaga, Spain, Sep. 8-10, 2003, pp. 117-123.

Lansdown, T.C., Visual demand and the introduction of advanced driver information systems into road vehicles. Loughborough University, Doctoral thesis submitted towards Doctor of Philosophy, Oct. 1996, 282 Pages.

Lee, J.D. et al., Speech-based interaction with in-vehicle computers: the effect of speech-based e-mail on drivers' attention to the roadway. Hum Factors. 2001 Winter;43(4):631-40.

Lee, J., et al., Linking the detection response task and the AttenD algorithm through the assessment of human-machine interface workload. Transportation Research Board 96th Annual Meeting, Washington, DC, vol. 17-06664, Jan. 2017, 15 pages.

Liang, Y., et al., How dangerous is looking away from the road? Algorithms predict crash risk from glance patterns in naturalistic driving. Hum Factors. Dec. 2012;54(6):1104-16.

Liu, A., et al., Towards real-time recognition of driver intentions. IEEE Conference on Intelligent Transportation System (ITSC'97), Boston, MA, Nov. 12, 1997, pp. 236-241.

Maciej, J., et al., Comparison of manual vs. speech-based interaction with in-vehicle information systems. Accid Anal Prev. Sep. 2009;41(5):924-30. doi: 10.1016/j.aap.2009.05.007. Epub Jun. 3, 2009.

Maye, J., et al., Bayesian on-line learning of driving behaviors. 2011 IEEE International Conference on Robotics and Automation (ICRA), Shanghai, China, May 9-13, 2011, pp. 4341-4346.

McCallum, A., et al., Maximum Entropy Markov Models for Information Extraction and Segmentation. Proceedings of the 17th International Conference on Machine Learning (ICML'00), San Francisco, CA, Jun. 29-Jul. 2, 2000, vol. 17, pp. 591-598.

\* cited by examiner

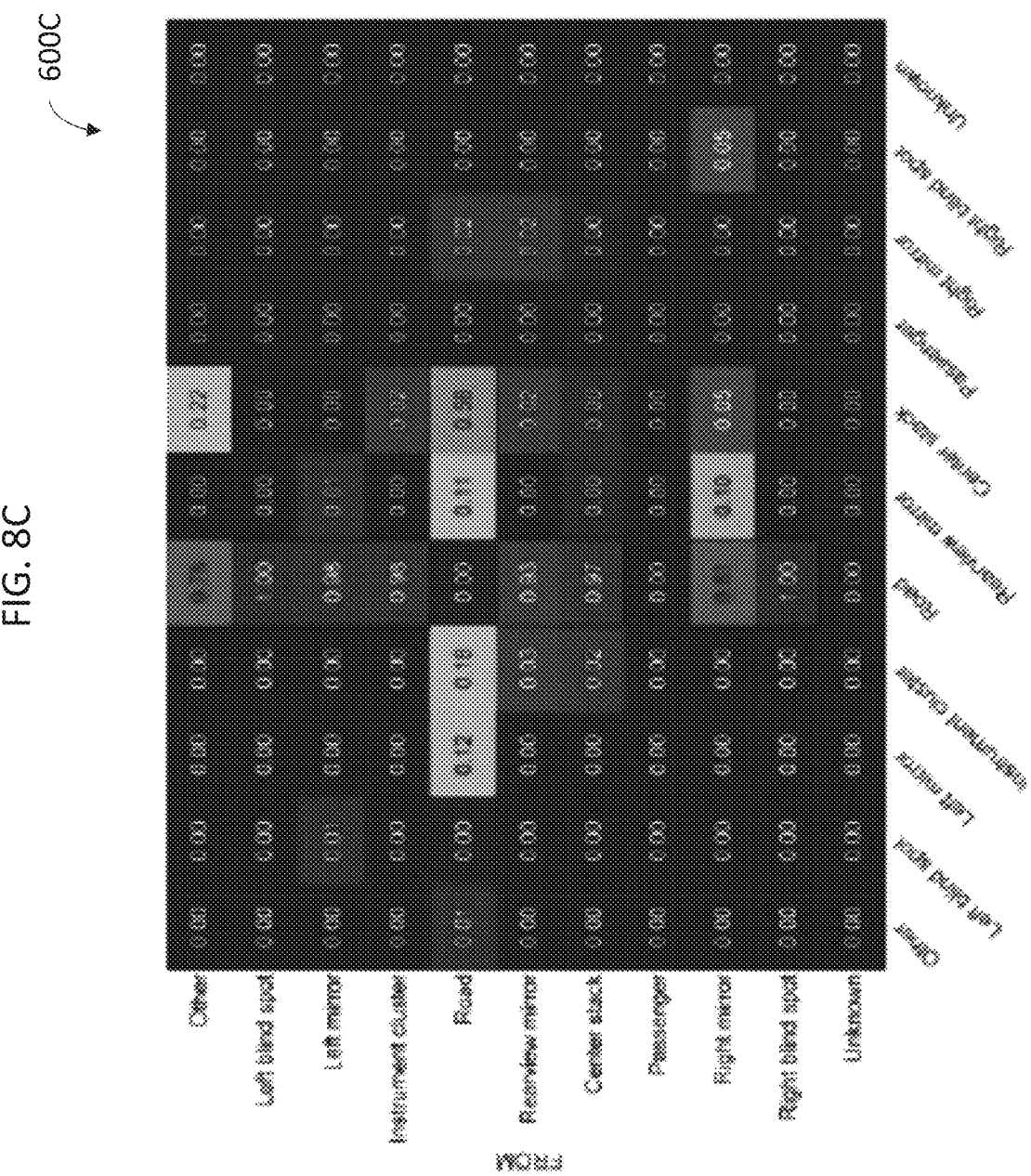

ized size and cost of these sensors has and continues to enable the application of more sensors and in more unlikely settings, such as in veins, on skin, in clothing, on teeth, and more. The growing number of sensors means that more data is being collected, shared, and analyzed, enabling more intelligent findings, predictions, decisions and the like to be made. Indeed, the Internet of Things (IoT), which is a vast network of interconnected "things" (e.g., objects, devices, people) including sensors and sensor-equipped objects, further promotes this collection, sharing and analysis of data.

SYSTEMS AND METHODS FOR PROVIDING VISUAL ALLOCATION MANAGEMENT

CROSS REFERENCE TO RELATED APPLICATION

The present application claims priority to and the benefit of U.S. Provisional Application No. 62/377,213, filed on Aug. 19, 2016, and titled "Attention Maps," the content of which is incorporated herein by reference in its entirety.

FIELD

The present application relates to systems and methods for providing visual allocation management based on an assessments of an individual's visual distribution while engaging in an activity in a dynamically changing environment, and use that assessment to predict or infer states, behaviors, activities, and the like being performed by the individual despite the states, behaviors, activities and the like not being readily observable, apparent, or detectable from the individual's visual allocation. While the systems and methods related to such assessments can be used with respect to many activities, one non-limiting activity to which the present disclosures are applicable is the activity of driving to provide real-time feedback.

BACKGROUND

Technological advances continue to make sensors less expensive and smaller, thereby enabling their mass dissemination and use to make nearly any physical object or being "smart" or "intelligent." These sensors refer to electronic devices that can collect and transmit data. While sensors have been used in the recent past in connection with appliances, machinery, vehicles, homes, highways, cities, to name a few examples, the shrinking size and cost of these sensors has and continues to enable the application of more sensors and in more unlikely settings, such as in veins, on skin, in clothing, on teeth, and more. The growing number of sensors means that more data is being collected, shared, and analyzed, enabling more intelligent findings, predictions, decisions and the like to be made. Indeed, the Internet of Things (IoT), which is a vast network of interconnected "things" (e.g., objects, devices, people) including sensors and sensor-equipped objects, further promotes this collection, sharing and analysis of data.

One example of such type of data is related to individuals' visual behavior, which can be captured by sensors such as cameras, and distributed and/or analyzed to infer information therefrom. For example, various techniques have been studied for measuring individuals' visual attention in the context of driving a vehicle. These studies have focused on concepts such as identifying the effect of performing visual-manual tasks on the probability of the occurrence of a safety-critical event while driving a vehicle. Moreover, these studies often measure such attentional demand based on total time that visual attention is directed away from the forward roadway or to elements of in-vehicle interfaces. Such existing studies therefore fail to consider drivers' visual behavior, whether positive or negative, across a broad driving environment over a period of time.

Accordingly, there is a need for systems and methods that provide visual allocation management by more broadly considering individuals' visual behavior or allocation, including the visual behavior or allocation of drivers operating vehicles. There is also a need for such visual behavior to be able to be measured based on visual direction, duration, and patterns or transitions between glances. Moreover, there is a need for human behaviors, awareness, attention, strategies, emotions, and other mental and physical states (e.g., activities, tasks) (collectively "states") to be modeled such that the measured visual allocation can be compared to predict or determine the presence or occurrence of such non-observable or non-detectable states of the individual while performing the measured visual behavior. These states that are modeled and against which the measured visual allocation is compared to include positive, neutral, and negative types. Further, there is a need for feedback to be determinable based on the detected or inferred states, and to be capable of providing the feedback in real-time, or near real-time, accounting for the natural delay a person having skill in the art understands occurs even in systems qualified as "real-time". Lastly, there is a need for the visual allocation management to be applicable to driving scenarios as well as other activities in which visual behavior or allocation implies the presence of states that are not otherwise readily available or obtainable.

SUMMARY

Systems and methods are provided herein for managing visual allocation. More specifically, visual allocation management systems and methods are described herein that use captured visual data of a person engaged in an activity and, based on that visual data and/or other contextual information, identifies or infers states of the person while engaging in the activity, such that one or more responsive actions can be triggered. States are used herein to refer to a person's attention, awareness, emotions (e.g., fear, anger), or other mental or physical states (e.g., drowsiness) that, in some instances, are not-readily observable or measurable from the visual data. As described herein, visual data of a person is obtained while engaging in one or more activities, such as driving. The visual data can be captured using a variety of sensors, including one or more cameras. Visual features, such as pupil position, can be derived or extracted from the visual data, such that glance information can be calculated. The glance information can include glance direction, glance duration, and glance transitions.

The visual data, data derived from the visual data (e.g., glance information), and other obtained contextual information can be input into or used with one or more models corresponding to human states. The models can be a variety of mathematical and/or statistical models, and can be pre-determined and/or pre-stored. The models correspond to or are modeled data representations of states, which can include tasks, behaviors, awareness, attention, and the like engaged in or relating to the person during the period of activity engaged in by the person. The input data can be compared to the data representations of the models in order to calculate the respective probabilities of each model. Each of the probabilities calculated and/or output by the models indicates the likelihood that the person, while engaged in the one or more activities, was also engaged in or experiencing the state represented by the model. Often, the model or models resulting in the highest probabilities are deemed to be the most likely states corresponding to the person. Based on the identified states, optimal or required feedback is determined using, for instance, rules, thresholds, and the like. The calculated or determined optimal or required feedback is output to a connected system, object, device, person, and the like. The feedback and output can be used to identify and/or promote particular behaviors, levels of attention or awareness, tasks, and more.

In one exemplary embodiment of a system for managing visual allocation, at least one memory and at least one processor communicatively coupled to the at least one memory are provided. The memory stores one or more models, which include at least one of: (1) a model corresponding to a plurality of candidate states; and (2) a plurality of models in which each model corresponds to one of the plurality of candidate states. Visual data corresponding to a person engaging in an activity during a continuous period of time is received. From the visual data, a sequence of glances is identified. Moreover, for each glance in the sequence of glances, corresponding glance information including a glance direction is identified. Each of the glances in the sequence of glances is classified into a spatial region from among a set of predetermined spatial regions based on their respective glance information. Based on the one or more models, the presence of one or more states of the person while engaging in the activity during the continuous period of time is identified by inputting into each of the stored one or more models model input data including one or more of (1) the classification of the glances in the sequence of glances, and (2) the glance information of the glances in the sequence of glances. Feedback is output based on the identified one or more states.

In some embodiments, one or more eye image sequences are identified in the visual data. The one or more eye image sequences include images of the eye region of the person engaging in the activity during the continuous period of time. The visual features are extracted from each of the images of the one or more eye image sequences. The sequence of glances and corresponding glance information are identified from the one or more eye image sequences based on the extracted visual features.

In some embodiments, the presence of one or more states at a given instance during the continuous period of time is identified as follows. Respective probabilities of the presence of each of the plurality of candidate states are calculated, by the one or more models, based on model input data. One or more of the plurality of candidate states having the highest respective calculated probabilities of presence at the given instance during the continuous period of time are selected as the identified one or more states.

In some embodiments, output feedback includes one or more of: (1) the probability of the presence of each of the plurality of candidate states during the continuous period of time; (2) the identified one or more states having the highest respective calculated probabilities of presence during the continuous period of time; and (3) instructions based on the identified one or more states of the person while engage in the activity during the continuous period of time.

In some embodiments, one or more of a glance duration and a glance transition are identified for each of the sequence of glances. The glance transition indicates the glance direction of a next glance in the sequence of glances. The glance information of each of the sequence of glances further includes the one or more of the respective glance duration and glance transition. Identifying of the one or more states is further based on the one or more of the glance duration and the glance transition of each of the sequence of glances. Moreover, one or more glance patterns are identified from among the sequence of glances based on the classification of each of the sequence of glances and/or the glance transitions of each of the sequence of glances. Additionally, identifying the presence of the one or more states is further based on the glance transition patterns input into each of the one or more models.

In some embodiments, the one or more models are Hidden Markov Models. Moreover, each of the one or more eye image sequences correspond to a single individual, and are captured using one or more cameras.

In some embodiments, receiving the visual data and outputting the result are performed in real-time.

In some embodiments, contextual data is received from one or more communicatively coupled systems. Identifying the presence of the one or more states is further based on the contextual data. The contextual data can include at least one of environment data, surrounding data, and user data.

In some embodiments, the one or more models are trained using (1) visual data corresponding to a plurality of people engaging in the activity during continuous periods of time, and (2) state data including one or more states present in the plurality of people while engaging in the activity.

In some embodiments, a vehicle comprises the system for managing visual allocation described herein. The person engaging in the activity is a driver engaging in the operating of the vehicle. The output feedback includes the instructions based on the identified one or more states. The instructions include one or more of: (1) instructions to manage the spatial attention or awareness of the driver of the vehicle, (2) instructions causing an impact on control of the vehicle, and (3) instructions to augment an exchange of information with at least one of the vehicle and the driver of the vehicle. The instructions to augment an exchange of information with at least one of the vehicle and the driver of the vehicle can include instructions to suppress an exchange of information to and from the vehicle.

In one exemplary embodiment of a method for managing visual allocation, one or more models are stored, which include at least one of: (1) a model corresponding to a plurality of candidate states; and (2) a plurality of models in which each model corresponds to one of the plurality of candidate states. Visual data corresponding to a person engaging in an activity during a continuous period of time is received. A sequence of glances is identified from the visual data. For each glance in the sequence of glances, corresponding glance information that including a glance direction is identified. Each of the glances in the sequence of glances is classified into a spatial region selected from among a set of predetermined spatial regions, based on their respective glance information. Moreover, based on the one or more models, the presence of one or more states of the person while engaging in the activity during the continuous period of time are identified by inputting into each of the stored one or more models model input data including one or more of (1) the classification of the glances in the sequence of glances and (2) the glance information of the glances in the sequence of glances. Feedback based on the identified one or more states is output.

In some embodiments, one or more eye image sequences are identified in the visual data. The one or more eye image sequences including images of the eye region of the person engaging in the activity during the continuous period of time. Visual features are extracted from each of the images of the one or more eye image sequences. The sequence of glances and corresponding glance information are identified from the one or more eye image sequences based on the extracted visual features.

In some embodiments, the presence of one or more states at a given instance during the continuous period of time is identified as follows. Respective probabilities of the presence of each of the plurality of candidate states are calculated, by the one or more models, based on model input data. One or more of the plurality of candidate states having the highest respective calculated probabilities of presence at the given instance during the continuous period of time are selected as the identified one or more states.

In some embodiments, outputting the feedback includes: (1) determining the probability of the presence of each of the plurality of candidate states during the continuous period of time; (2) determining the identified one or more states having the highest respective calculated probabilities of presence during the continuous period of time; and (3) providing instructions based on the identified one or more states of the person while engage in the activity during the continuous period of time.

In some embodiments, one or more of a glance duration and a glance transition are identified, for each of the sequence of glances. The glance transition indicates the glance direction of a next glance in the sequence of glances. The glance information of each of the sequence of glances further includes the one or more of the respective glance duration and glance transition. Moreover, identifying of the one or more states is further based on the one or more of the glance duration and the glance transition of each of the sequence of glances.

In some embodiments, one or more glance patterns from among the sequence of glances are identified based on the classification of each of the sequence of glances and/or the glance transitions of each of the sequence of glances. Identifying the presence of the one or more states is further based on the glance transition patterns input into each of the one or more models.

In some embodiments, the one or more models are Hidden Markov Models. Moreover, in some embodiments, each of the one or more eye image sequences correspond to a single individual and are captured using one or more cameras.

In some embodiments, receiving of the visual data and outputting the result are performed in real-time.

In some embodiments, contextual data is received from one or more communicatively coupled systems. Moreover, identifying the presence of the one or more states is further based on the contextual data. Further, the contextual data includes at least one of environment data, surrounding data, and user data.

In some embodiments, the one or more models are trained using (1) visual data corresponding to a plurality of people engaging in the activity during continuous periods of time, and (2) state data including one or more states present in the plurality of people while engaging in the activity.

In one exemplary system for managing visual allocation, at least one memory and at least one processor communicatively coupled to the at least one memory are provided. Visual data corresponding to a plurality of people engaging in an activity during a continuous period of time, and state data including one or more states present in the plurality of people while engaging in the activity during the continuous period of time are received. One or more mathematical structures are calculated using the visual data. One or more models corresponding to each of the one or more states are trained based on one or more of the calculated mathematical structures. The trained one or more models are stored in the one or more memories. Using the trained one or more models, the presence of at least one of the one or more states is identified using visual data of a person engaging in the activity during a different continuous period of time.

In some embodiments, the mathematical structures include structures represent glances in the visual data in the context of at least one of glance transitions and glance duration. Moreover, the mathematical structures can include one or more matrices selected from the group consisting of: (i) a transition counts matrix; (ii) a transition probabilities matrix; (iii) a transition importance mask matrix; (iv) a transition significance matrix; (v) a duration counts matrix; (vi) a time distribution per location percentage matrix; (vii) a time distribution per transition percentage matrix; and (viii) a duration importance mask matrix.

In some embodiments, the transition counts matrix includes data representing a number of times that the glances in the visual data transition from one glance location to another glance location from among a set of predetermined candidate glance locations; the transition probabilities matrix includes data representing a relative frequency that each of the glances transition to another candidate glance location, calculated by dividing values of the transition count value matrix by the sum of all values in the respective row; the transition importance mask matrix includes data calculated by dividing values of the transition counts matrix by the largest value among the values of the respective row; the transition significance matrix includes data calculated by multiplying the transition probabilities matrix by the transition significance matrix; the duration counts matrix includes data representing a duration of each of the glances; the time distribution per location percentage matrix includes data representing an aggregation of the durations of the glances for each of the candidate glance locations, obtained by normalizing the duration counts matrix by candidate glance location; the time distribution per transition percentage matrix includes data representing the aggregation of the duration of the glances for each of the candidate glance locations relative to all of the candidate glance locations, obtained by normalizing the duration counts matrix by all of the candidate glance locations; and the duration importance mask matrix representing data calculated by normalizing the duration counts matrix to unity.

In some embodiments, the one or more states of the person engaging in the activity during the other continuous period of time is not identified in the visual data of the person.

BRIEF DESCRIPTION OF DRAWINGS

This disclosure will be more fully understood from the following detailed description taken in conjunction with the accompanying drawings, in which:

FIG. 8C is matrix illustrating one exemplary embodiment of a transition probability matrix corresponding to a auditory-vocal radio manipulation state.

DETAILED DESCRIPTION

Figure 1:
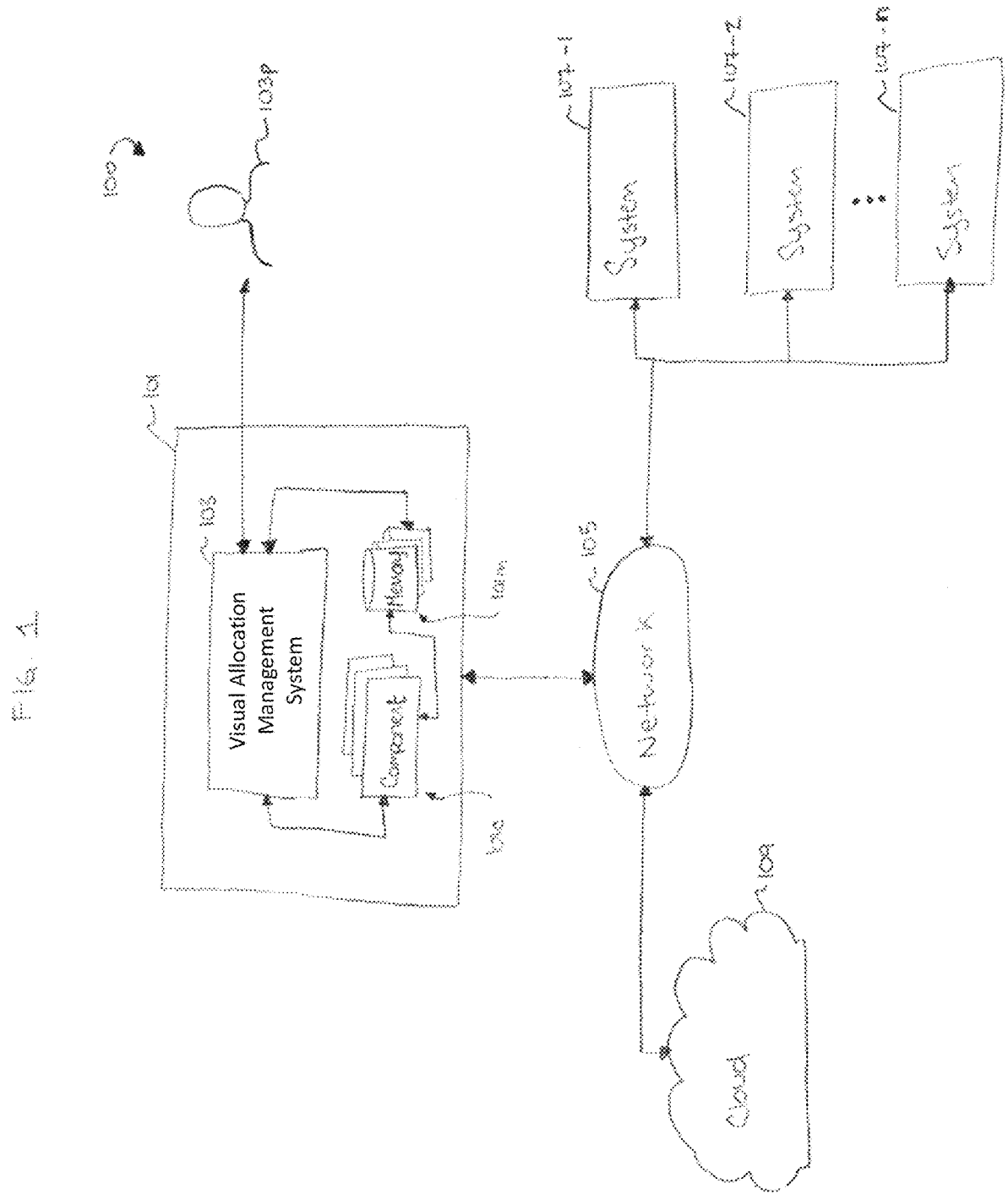
FIG. 1 is a schematic diagram of one exemplary embodiment of a computing device ecosystem that includes a visual allocation management system.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. In the present disclosure, like-numbered components of various embodiments generally have similar features when those components are of a similar nature and/or serve a similar purpose. A person skilled in the art, in view of the present disclosure, will understand various instances in which like-numbered components across various figures are akin. Additionally, in a number of instances, various terms understood or otherwise known to those skilled in the art, and/or provided for in the present disclosure, are used interchangeably. By way of non-limiting example, terms such as awareness and attention, and operator and user, may be used interchangeably.

The systems and methods described herein allow for visual allocation management using models to identify human states from human visual data, and calculate appropriate feedback based on the identified human states. While the described systems and methods can be used in a multitude of ways, some of which are described herein, one application is for providing real-time visual allocation management, which includes near real-time, accounting for the natural delay a person having skill in the art understands occurs even in systems qualified as "real-time". To these ends, a visual allocation management system obtains visual data of a person engaged in an activity. The visual data can be obtained by capturing video or images of the person during their engagement in the activity using sensors of the visual allocation management system, some of which can include video or photographic cameras. The visual data can include at least an eye image sequence of the person while engaged in the activity. Visual features, such as pupil position, can be extracted from the visual data and, in turn, used to calculate glance information throughout the engagement of the person in the activity. Glance information can include glance direction (e.g., what the person is looking at, or the direction or region that the person is looking at, at a given time), glance duration (e.g., how long the person is looking in the glance direction at the given time), and/or glance transitions (e.g., when the person moves from looking in one direction to looking in another direction). Each glance in the visual data in classified according at least to its direction or spatial region.

Further in connection with the visual allocation management described herein, contextual information can be obtained from a variety of interconnected devices, systems, and the like. The contextual information can include virtually any type of data that can be used to determine the state of the human during the engagement of the activity, or to determine optimal feedback based on the identified states. The visual data, the information derived therefrom such as the glance information, and/or the contextual data can be input into pre-stored models corresponding to each potential or candidate state that the person can be engaged in during the activity. The models can be mathematical models, such as Hidden Markov Models and other statistical models, or can be models based upon learning algorithms (e.g., artificial intelligence). Each of the models can include data representations and/or a set of assumptions of how a person, or the person, would behave in a given state while engaging in the activity. Each of the models can therefore compare the input data to the its data representations or assumptions and output a probability of whether the person, while engaged in the activity, was in or performing its respective modeled state.

Based on these output probabilities form the models, which identify the state or states of the person while performing the activity, an optimal, required, or recommended feedback can be determined. Determining the feedback can be based on the identified state or states, contextual information, and/or rules and thresholds indicating how the output result from the models should or could be handled. The feedback can include warnings, instructions, notifications, messages, responses, requests, and the like, which can be configured or targeted for remedial purposes as described in further detail below including, for example, to provide adaptive functionality or control and/or adaptive display or user interfaces. In turn, the determined feedback can be executed by the visual allocation management system and/or other systems, devices, objects, or the like, coupled thereto.

In some exemplary embodiments described herein, the visual allocation management process and system are described in connection with the operating (e.g., driving) of a vehicle by a driver. In such embodiments, the visual allocation management is embedded in or communicatively coupled to the vehicle. Visual data in the form of recorded video of the driver while driving the vehicle can be captured using cameras. The recorded video can include a sequence of images of the driver during the driving of the vehicle. Visual features, such as the pupil position of the driver during each image sequence of the recorded video, can be identified, and, based on the pupil position, the spatial region or direction at or to which the driver is looking can be determined.

Each of the images in the eye images sequence, or a subset of the eye image sequences corresponding to a glance, is classified and/or assigned to a predetermined set of spatial regions. These spatial regions can be areas on the windshield, side mirrors, steering wheel, gauges, infotainment system, and the like. This information, as well as contextual data that is obtained from, for example, other vehicles, cloud storage, and/or other systems, is input into models of the states. These models represent states of the human being that are not readily observable or detectable from the captured visual data. For instance, the states can be related to the driver's attention, awareness, emotions (e.g., fear, anger), or other mental or physical states (e.g., drowsiness). Each of the models outputs a probability that the driver was under or engaged in the respective modeled state.

Based on the output probabilities, the visual allocation management system can determine appropriate feedback. The purpose of the feedback can vary, including to promote other behavior or states, to alter attention, awareness or emotional states, to remedy potential issues, to motivate, and more. The feedback can be in the form of instructions, warnings, and the like, and can be sent to the vehicle in which the visual allocation management system is provided, or to interconnected systems or objects, such as other vehicles, cloud systems, and the like. It should of course be understood that the use of the visual allocation management system is provided merely as an example for illustrative purposes, and a person of skill in the art will understand the many applications of the visual allocation management described herein, some non-limiting examples of which are provided for herein.

Visual Allocation Management Ecosystem

FIG. 1 illustrates an exemplary embodiment of a computing device ecosystem 100 in which the present disclosures related to managing visual allocation can be used. In some embodiments, the term "visual allocation" is used herein to refer to the distribution or assignment of a person's vision, gaze(s), glance(s) and the like, including assigning the eye movements to a spatial region, location, direction, or the like at a given time. It should be understood that managing visual allocation refers, in some embodiments, to obtaining and analyzing visual data (e.g., glance direction, glance duration, glance transitions) and/or contextual data to determine or predict the corresponding human states (e.g., behaviors, activities, tasks, and the like) and outputting information based thereon. It should be understood that the visual data can serve as a proxy for visual attention and/or awareness, meaning that the obtained visual data can represent or imply attention or awareness information. Likewise, the outputs described herein can be used to manage, alter, encourage or otherwise have an effect on a human's visual attention or awareness.

The ecosystem 100 includes various systems, devices, objects, networks, infrastructures, and the like that are configured to collect, store, manipulate, and calculate data to manage a person's visual allocation. It should be understood that the computing device ecosystem 100 can include any number and type of interconnected systems, devices, objects, infrastructure, and the like. For example, the ecosystem 100 can refer to the Internet of Things (IoT), a home network, an office network, or a similar set of interconnected devices. It should also be understood that, in the illustrated exemplary computing device ecosystem 100, data can be transferred via wired or wireless communications.

As shown in FIG. 1, the ecosystem 100 includes a visual allocation management system 103 that is configured to, among other things, manage visual allocation. To this end, the visual allocation management system 103 collects or determines visual allocation data or simply "visual data" of or related to a person 103p. As explained in further detail below, visual data can include, in raw form, imaging of the person 103p and, in processed form, data derived therefrom, such as eye image sequences; visual features and characteristics used to identify visual features, including pupil positions, eye state (e.g., open, closed), facial features, and other features known to those of skill in the art; glance directions; glance durations; glance transitions, and the like. It should be understood that the terms "individuals," "humans," "people," "persons," "users" and other similar terms are used interchangeably herein to refer to the person or persons whose visual allocation, and data related thereto, is captured and/or processed by the visual allocation management system 103. It should also be understood that the visual allocation management system 103, and the other components and/or systems of the computing device ecosystem 100, are configured to manage visual allocation of any number of individuals, sequentially or simultaneously. Nonetheless, for the sake of simplicity, only a single person 103p is illustrated in FIG. 1, and embodiments described herein may refer to use of the visual allocation management system 103 in connection a single person merely for the sake of simplicity.

Based on the visual data collected or determined by the visual allocation management system 103, the system 103 calculates, estimates, or otherwise identifies states that are being experienced by, exposed to, performed by, or otherwise affecting or impacting the person 103p during the time period related to the captured visual data, and/or how the visual data of the person 103p compares to target strategies. As described in further detail herein, in some embodiments, the visual allocation management system 103 can be incorporated or embedded in, and/or communicatively coupled to, a monitoring system 101, which can manage and/or be managed based on the processing and results produced by the visual allocation management system 103. The visual allocation management system 103 and/or the monitoring system 101 are communicatively coupled, via a network 105, to various systems including a cloud 109 and systems 107-1, 107-2, . . . , 107-n (collectively referred to as "systems 107"). As described in further detail herein, the visual allocation management system 103 and/or monitoring system 101 can collaborate with the systems 107 and cloud 109, for example, to provide enhanced central connectivity, sharing of data and other resources, and ultimately provide more efficient and effective visual allocation management. One non-limiting example of a system 107 that can be communicatively coupled to the visual allocation management system 103 (or embedded therein) is a resource allocation management system that can dynamically measure and assess a person's attention level while engaging in an activity, based on a variety of factors including visual allocation and calculated states of the person and/or vehicle, and/or other factors surrounding and/or otherwise related thereto, as described in detail in U.S. Patent Applications entitled "Systems and Methods for Using an Attention Buffer to Improve Resource Management" of Seppelt et al., filed on the same day as the present application, the content of which is incorporated by reference herein in its entirety.

More specifically and still with reference to FIG. 1, although not illustrated in FIG. 1, the visual allocation management system 103 includes one or more processors, one or more memories, and/or one or more sensors that are communicatively coupled and configured to provide visual allocation management. In some embodiments, the one or more memories of the visual allocation management system 103 can store code or logic that can be executed by the one or more processors to perform the allocation management described herein. Alternatively or additionally, all or portions of the code or logic of the for providing visual allocation management can be stored and executed in or by memories, processors and/or other components of, in, or associated with (1) the cloud 109, and/or (2) the monitoring system 101 (e.g., a vehicle), which are described in further detail below. Still further, the one or more memories can be operable to have data detected, determined, or otherwise received by the system 103 stored therein, such as data received about the user and subsequently analyzed by the system 103, such analysis provided in further detail below.

The sensors of the visual allocation management system 103 can include one or more cameras that are configured to capture visual allocation data of a person, using various techniques understood to those of skill in the art. It should be understood that the terms "visual allocation data" or "visual data" can refer to (1) unprocessed (e.g., raw) data associated with one or more of the eye region of a person 103*p* and a head of the user 103*p* during a time period T, or (2) processed data, meaning information derived from the raw or unprocessed data. For example, the visual allocation data can refer to continuous video or periodic still images of the person 103*p*, which in some instances is captured by cameras that are part of, or in communication with, the visual allocation management system 103. While the person 103*p* can be imaged from various angles and distances, the video and/or images include at least imaging of the eye or eye region of the person 103*p*, such that eye images or image sequences can be derived therefrom and/or imaging of the head of the person 103*p*, such that a direction in which the person 103*p* is looking can be ascertained. In some embodiments, the visual allocation data can be pre-captured by another device and stored in an interconnected memory or the memory of the visual allocation management system 103. Moreover, as known to those of skill in the art, visual allocation data can be obtained or derived from data collected from sensors that measure, for example, eyelid movements, eye or face muscle movements, brain waves, thermal or acoustic imaging (or using other forms of energy), and the like.

The cameras of or otherwise in communication with the visual allocation management system 103 can be configured to capture visual allocation data (e.g., video, still images) continuously or as triggered by particular events or actions, as described in further detail below. The captured visual data can be stored in one or more memories (e.g., volatile or non-volatile), such as the memories of the visual allocation management system 103, and processed as described below to provide feedback, instructions, and/or other outputs related to the visual allocation of the person 103*p*.

Still with reference to FIG. 1, the monitoring system 101 is a system, set of systems, infrastructure, object, or the like that includes, has embedded therein, or operates together with the visual allocation management system 103. While in FIG. 1 the monitoring system 101 and visual allocation management system 103 are shown as independent elements, it should be understood that in some embodiments the visual allocation management system 103 and the monitoring system 101 can refer to a single cohesive system or set of systems. Although the monitoring system 101 can be one of many varieties, in one exemplary embodiment described herein, the monitoring system 101 is a vehicle that includes the visual allocation management system 103. In such a scenario, for example, the visual allocation management system 103 can capture visual data (e.g., video, images) of the eye region and/or the head of the driver 103*p* during a time period T, determine the behavior of the individual 103*p* during the time period T based on the captured visual data, and output data (e.g., instructions, warnings, notifications, etc.) to the vehicle 101, the person 103*p*, or other component of the system (e.g. portable technologies and other systems in the ecosystem 100, whether illustrated or otherwise known as possible components or systems that can be provided in ecosystems of this nature). For example, the output data can be instructions to assume control or partial control of the vehicle 101. In some embodiments, the type or details of the output data can be based on pre-determined and/or pre-stored rules, threshold, targets (e.g., target strategies), and the like. In this regard, the rules, thresholds, targets or the like can be stored in the memory or memories of the visual allocation management system 103 or any interconnected memories (e.g., in the cloud 109, in other connected devices and systems, etc.).

As illustrated, the monitoring system 101 includes one or more memories 101*m* and one or more components 101*c*. The memories 101*m* can be used by the monitoring system 101 to store its own data, rules, code, logic, and the like, including such data, rules, code, logic, and the like provided prior to operation of the system 101, as well as data, rules, code, logic, and the like received and/or derived as a result of operating the system 101, such as data received, rules and logic that are adjusted in view of data received, etc. For example, in the example mentioned above and described herein in which the monitoring system 101 is a vehicle, the data stored in the memories 101*m* can include information about the vehicle (e.g., fuel levels, oil levels, tire pressure, remaining battery capacity), information sensed or captured by the vehicle (e.g., temperature of different parts, outside temperature, speed, location), information relating to surrounding environment (e.g., objects, obstacles, other vehicles), and other data relating to a driver or passengers of the vehicle, time, trip, forecasts, and the like. It should be understood that these non-limiting examples are presented for illustration, and that a person of ordinary skill in the art will recognize other types of data that can be stored by the monitoring system 101, and other types of the monitoring system 101 other than the vehicle exemplary embodiment described herein.

In some embodiments, the data that is stored in the memories 101*m* of the system 101 is captured or obtained by, or associated with, the components 101*c*. The components 101*c* of the monitoring system 101 can be any objects, devices, parts, components or the like of, embedded in, attached, or tethered to the monitoring system 101, and/or that is operable to collect and/or transmit data. As one non-limiting example, the components 101*c* can include sensors. In the scenario described above in which the monitoring system 101 is a vehicle, the components 101*c* can be sensors such as road condition sensors, distance sensors, air pressure sensors, global positioning system (GPS) sensors, and others known to those of skill in the art. Moreover, in connection with the exemplary scenario in which the monitoring system 101 is a vehicle, the components 101 can include in-vehicle displays (e.g., an in-vehicle infotainment (IVI) center/system, entertainment center/system an instrument panel/dashboard, etc.) and/or devices associated with or tethered to the vehicle (e.g., using Bluetooth, Wi-Fi, or the like) such as mobile devices, audio players, video players, screens, tablets, computers, and the like. It should be understood that the components 101*c* can be or can include one or more processors.

The data stored in the memories 101*m* and/or captured, generated, or associated with the components 101*c* can be shared with or transmitted to the visual allocation management system 103 to provide enhanced context during the management of visual allocation described herein. As an illustrative example, freezing temperature and slick surface data obtained or sensed by the components 101c (e.g., sensors) of the system 101 can be transmitted to and/or used by the visual allocation management system 103, for example, such that the target strategy against which the captured visual data of the person (e.g., driver) 103p is compared can be adjusted or heightened to account for the increased dangers presented by the road and environment conditions.

Still with reference to FIG. 1, as illustrated, the visual allocation management system 103 and monitoring system 101, including those subsystems or components provided therein (e.g., as detailed in FIGS. 2 and 3 below) can be connected to, operated by, and/or have or be associated with data and components in or of various systems 107 and a cloud 109. Such communications between the visual allocation management system 103, the monitoring system 101, systems 107 and cloud 109 can be performed via the network 105. The network 105 can include one or more networks. Non-limiting examples of the network 105 include the Internet, a private area network (PAN), a local area network (LAN), a wide area network (WAN), an enterprise private network (EPN), a virtual private network (VPN), and the like. Such communications via the network 105 can be performed using a variety of wired and wireless techniques, standards and protocols, known to those of skill in the art, including Wi-Fi, Bluetooth, and cellular or satellite service. Moreover, in some embodiments, the systems 101, 103, 107, and 109, and/or their respective devices, components, parts, sensors, subsystems, etc. (e.g., components 101c) can communicate via, for example, short-range communication technologies and standards such as Bluetooth, and/or using configurations such as a controller area network (CAN) bus and others known to those of skill in the art. To these ends, although not illustrated in FIG. 1, the systems 101, 103, 107, and 109, and/or their respective devices, components, parts, sensors, subsystems, include hardware (e.g., radio, antenna) and logic to enable the above-mentioned communications.

It should be understood that although a single cloud 109 is illustrated in FIG. 1, the ecosystem 100 can include multiple clouds, including public and private clouds, as well as other techniques for data transmission, storage, and/or retrieval, which are known to those skilled in the art. Reference to storage in the cloud 109 herein by no means limits the ability to store in other locations. Likewise, although only three systems 107-1, 107-2, and 107-n are illustrated, any number of systems can be communicatively coupled to the monitoring system 101 and/or the visual allocation management system 103.

The cloud 109 refers to an infrastructure made up of shared computing resources and data that is accessible to devices such as the visual allocation management system 101, the monitoring system 103, and/or the systems 107. The shared computing resources can include networks, servers, storage, applications, and services. A person of skill in the art will understand that any type of data and devices can be included in the cloud 109. Nonetheless, one illustrative example of contents of the cloud 109 includes visual allocation data collected from connected systems 107 and stored in the cloud 109. Applications and services in the cloud 109 can be used to process the visual allocation data, for instance, to derive information therefrom. In the exemplary scenario described above in which the system 101 is a vehicle, the cloud 109 can derive or identify therefrom, for example, potential dangers and/or visual allocation patterns of drivers of other vehicles (e.g., systems 107) within proximity of the vehicle 101. In some embodiments, data or logic used by the visual allocation management system 103 are stored in the cloud 109. For example, models and rules used by the visual allocation management system 103 to output feedback, instructions, and the like, can be centrally stored in the cloud 109. By way of further example, data recorded or otherwise received by the system 103, as well as any output performed by any steps taken by the system 103 to analyze or otherwise use the received data, may also be centrally stored in the cloud 109. In some embodiments, these models can include mathematical models, statistical models, logical models, as well as artificial intelligence tools and techniques including Bayesian networks, Kalman filters, neural networks, kernel methods, and the like, as known to those of skill in the art.

The systems 107 can include virtually any system, device, object, person, infrastructure, or the like that can collect and/or communicate data, for example, with the visual allocation management system 103. For instance, the systems 107 can include: a house having a number of interconnected devices (e.g., refrigerator, television, heating and cooling system) and objects (e.g., doors, windows, security system) equipped with sensors; a factory made up of machinery equipped with sensors; a person equipped with mobile devices, implantable devices, wearable devices, and the like. A person of skill in the art will recognize other types of systems 107. Nonetheless, the systems 107 can provide data to or for the visual allocation management system 103 to perform more contextualized visual allocation management, and the visual allocation management system can output data or instructions to the systems 107, for example, based on the visual allocation management processing performed by the system 103.

As described in one example above, the systems 107 can include surrounding vehicles that are interconnected with the system/vehicle 101. The surrounding vehicles 107 can share their own sensed or gathered information with the vehicle 101, and vice-versa. In some embodiments, the vehicle 101 can transmit instructions and/or other data output from the visual allocation management system 103 to the surrounding vehicles 107, for example, to alert the drivers of the surrounding vehicles 107 and/or to instruct the surrounding vehicles 107 to maneuver or function in a certain manner (e.g., turn on headlights, reduce speed, stop, return to center of lane, increase separation distance from a specified vehicle), in light of visual allocation management results calculated or determined by the visual allocation management system 103.

Example embodiments in which an ecosystem 100 includes a visual allocation management system 103 used in a vehicle 101 to identify a driver's visual allocation, continuously calculate and output a level of situation awareness as the driver operates the vehicle, and interface with vehicle systems to aid in driver safety are described in detail below, in connection with FIGS. 2 to 9. It should be understood, however, that the ecosystem 100 and systems therein can be configured for and/or used in a variety of contexts. Non-limiting exemplary applications of the visual allocation management system 103 include:

Insurance Companies: to evaluate a specific operator's visual allocation as a measure of risk in determining insurance credits;

Fleet Management: to monitor vehicle operators' performance, both as individuals and across a fleet, to optimize fleet safety or award safety related bonuses;

Retail: to identify patterns of consumer visual allocation while shopping, and to improve or augment interactive interface displays to draw consumers' vision or visual attention back on-target;

Car-to-Car Networks: to upload visual allocation data from one car to a cloud network such that other cars can access the information and either the car or the driver can take into account awareness of vehicle's around them;

Actuarial science: to improve accuracy and detail of risk and uncertainty evaluations;

Accident Reconstruction: to evaluate the level of awareness of those involved in an accident, among other factors that can be determined in view of the present disclosures; and Law Enforcement: to identify common visual allocation patterns across drivers and take positive measures to address concerns, such as adjusting speed limits, signage or patrol cover; or to evaluate a particular operator's allocation at a particular time.

A person of skill in the art will understand the many other applications of the visual allocation management system 103. Additional non-limiting examples include aircraft operation, air traffic control, assembly line and quality control activities for example to scan for defects, x-ray scanning (e.g., of baggage).

Vehicle Equipped with Visual Allocation Management System

As explained above, the visual allocation management system 103 can be incorporated in many objects that can serve as the monitoring system 101. Such objects can benefit from classifying different levels of behavior, attention, and/or awareness, allowing the monitoring system 101 to make adjustments itself, or inform other components and/or people about actions that can be performed to make desirable adjustments in view of the results recorded and/or otherwise determined by the visual allocation management system 103. A vehicle is one non-limiting example of an object that benefits from the visual allocation management systems and methods provided for in the present disclosure. As described in greater detail below, a visual allocation management system incorporated into a vehicle can allow the system to provide instructions to the vehicle itself, the driver or operator of the vehicle, and/or other devices or other components interconnected or otherwise in communication with the vehicle and/or the visual allocation management system, to improve performance of the same.

Figure 2:
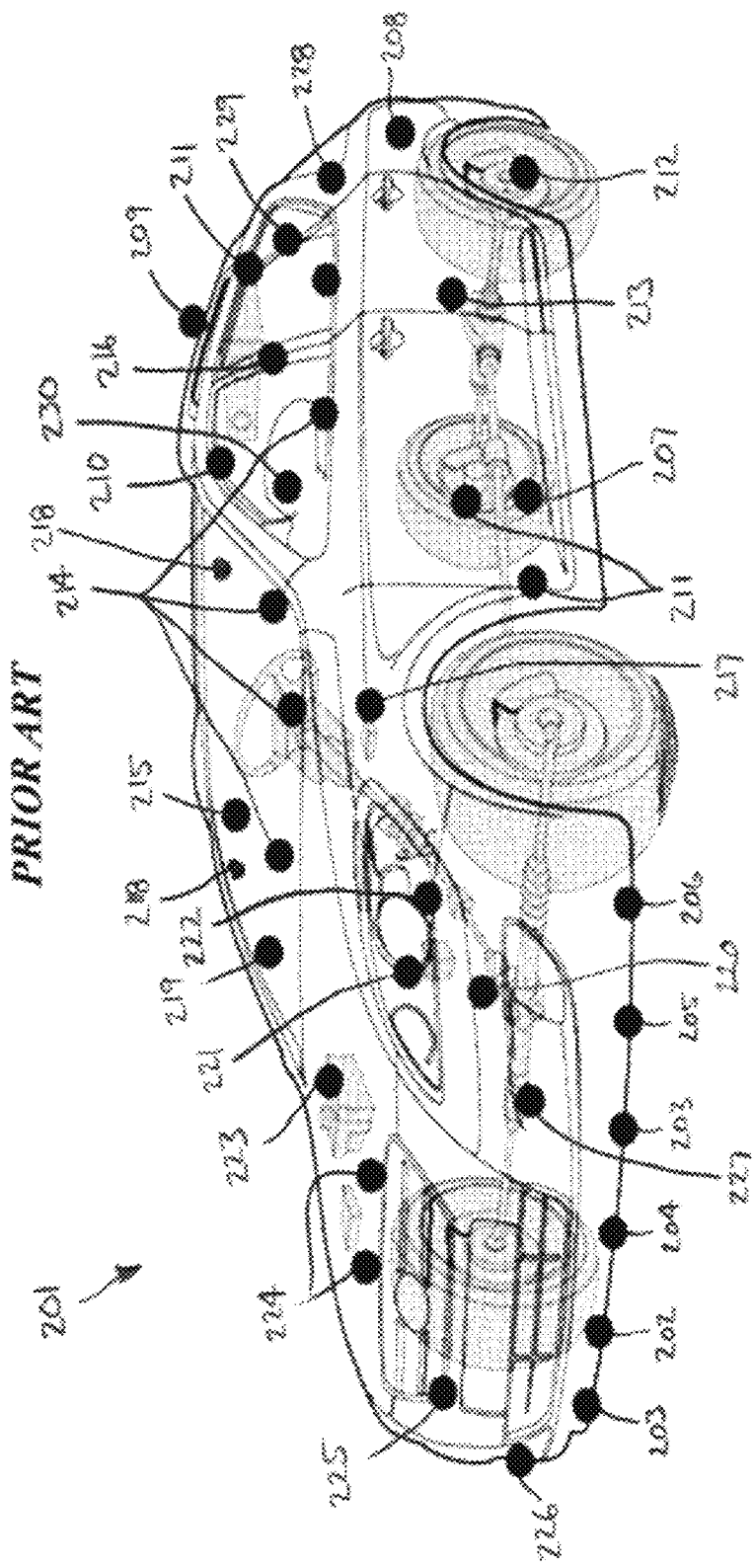
FIG. 2 is a schematic, perspective view of one exemplary embodiment of a vehicle for purposes of illustrating a non-limiting, plurality of locations at which sensors may be disposed with respect to a vehicle.

FIG. 2 provides a non-limiting illustration of the types of sensors and other monitoring components that can be included in a vehicle 201. The awareness of and afforded by these sensors and other components help improve the overall awareness of the vehicle 201, its operator, and other devices or components connected to the ecosystem (e.g., ecosystem 100). Other components connected to the ecosystem can include other monitoring systems associated with the vehicle 100, other vehicles (e.g., vehicles in the surrounding area, vehicles of a similar type, vehicles in a certain database), and global databases, where global can, but does not necessarily, mean across the world, and can include a more particular region, such as a surrounding environment of the vehicle, a region in which the vehicle is operated (e.g., city, state, territory, country, region in which an insurance provider provides coverage, etc.).

Some sensors and other monitoring components can be operated to detect an outside environment and how the vehicle 201 reacts to it. They include: a road condition sensor 202, magnetic sensors 203, a vehicle distance sensor 204, a forward obstacle sensor 205, a blind spot monitoring camera 206, a side obstacle sensor 207, a rear obstacle sensor 208, a road-to-vehicle/vehicle-to-vehicle communication system 209, and a rear view camera 210. Other sensors and monitoring components can be operated to monitor or control what happens on and/or within a vehicle. They include: drive recorders 211, an air pressure sensor 212, an inside door lock/unlock 213, airbags 214, a water repelling windshield 215, a seatbelt pretensioner 216, a driver monitoring sensor 217, one or cameras 218 to monitor a driver, a head-up display 219, a steering angle sensor 220, an electronic control throttle 221, an electronic control brake 222, a fire detection sensor 223, vehicle speed and acceleration sensors 224, a collision detection sensor 225, a pedestrian collision injury reduction structure 226, and electronic control steering 227.

Still further, other sensors and monitoring components can be operated to communicate information, which in turn can allow the vehicle 201 to react to it and/or other vehicles and components to react to the communicated information. They include: a Global Positioning System (GPS) sensor 228, a message display system 229, and a hands-free system 230. The labeled sensors and other monitoring components are by no means limiting, and a person skilled in the art will understand a plethora of other sensors and other monitoring components that can be incorporated with the vehicle 201 to sense and monitor an outside environment, the vehicle 201, and/or to communicate information between the vehicle 201 and other components of an ecosystem (e.g., the ecosystem 100). Further, a person skilled in the art will recognize that at least some of the identified sensors and monitoring components can perform multiple of these functions, including sensing the data and communicating that information, whether to other components of the vehicle 201 or to any other components of the ecosystem. Still further, to the extent the illustrated embodiment labeled a single sensor or other monitoring component, there may be multiple sensors or monitoring components of that type, and likewise, to the extent the illustrated embodiment labeled multiple sensors or other monitoring components, there may be instances in which only a single sensor or other monitoring component is provided.

Figure 3:
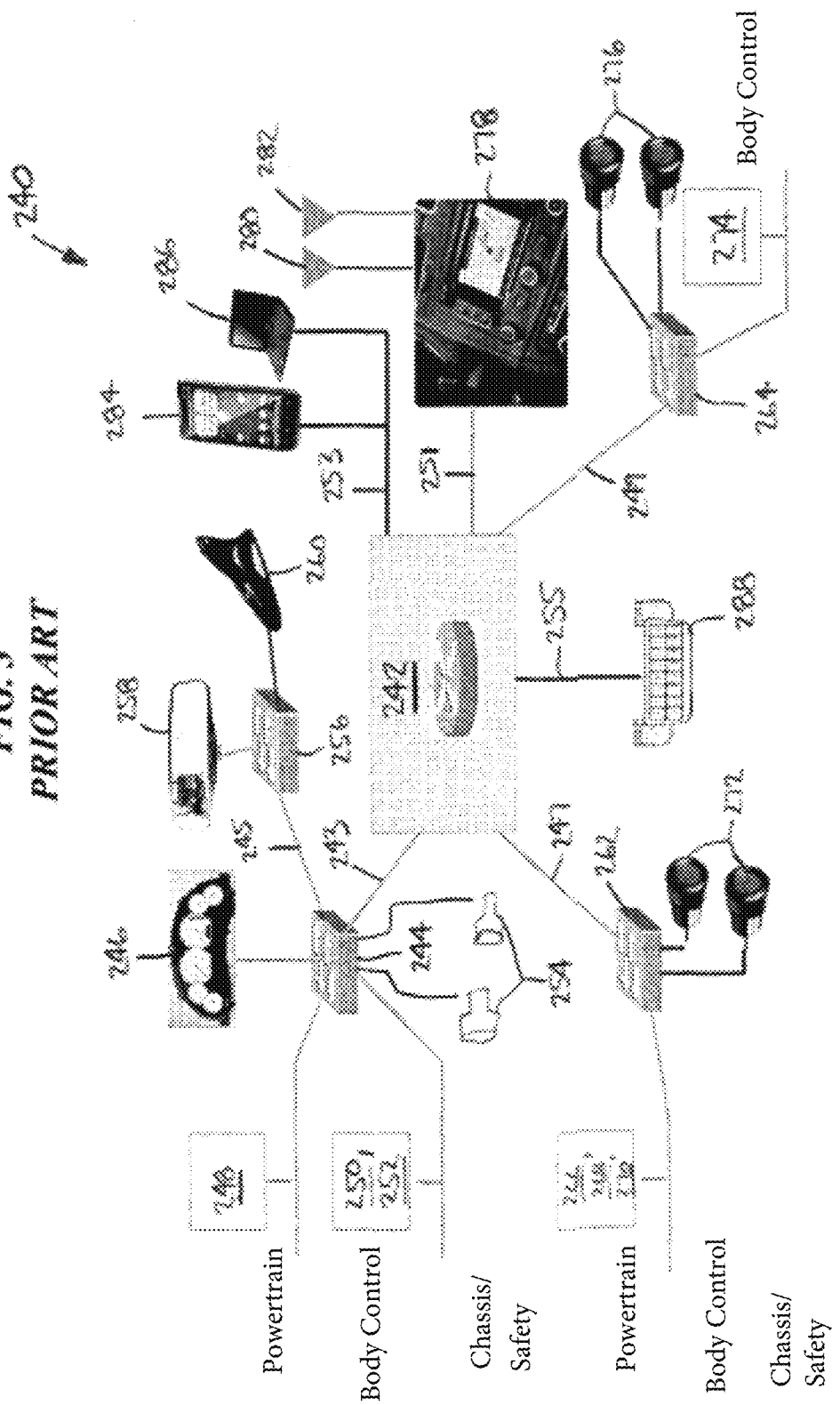
FIG. 3 is a schematic diagram of one exemplary embodiment of a vehicle communication network.

There are many ways by which the data or information sensed, recorded, or otherwise received by the sensors and other monitoring components of the vehicle 201 can be communicated amongst each other and/or to other locations (e.g., the cloud, other databases, other vehicles, etc.). Any means of data transmission can be used. FIG. 3 provides for one exemplary, non-limiting embodiment of a vehicle network 240 in which the vehicle 201 (not illustrated) includes an electronic control unit (ECU) 242 that allows the various systems within the vehicle 201 to communicate with each other and with an outside environment (e.g., the ecosystem 100). Electronic control units can include components such as a core (e.g., a microcontroller, etc.), one or more memories (e.g., static random access memory (SRAM), electrically erasable programmable read-only memory (EEPROM), flash, etc.), one or more inputs (e.g., supply voltage, digital inputs, analog inputs), one or more outputs (e.g., relay drivers, H bridge drivers, injector drivers, logic outputs, etc.), and communication links.

Some exemplary inputs are illustrated in FIG. 3. As shown, a first mini-switch or hub 244 can receive information from components such as an instrument cluster 246, a powertrain module 248, body control module 250, a chassis and/or safety module 252, one or more driver-facing video cameras 254, and a second mini-switch or hub 256, which itself can receive information from components such as a rear view mirror 258 and a telemetry module 260. In the illustrated embodiment, the body control module 250 and the chassis and/or safety module 252 are combined into a single module. The telemetry module 260, like other components provided for herein, can communicate within and outside of the vehicle by way of any known means for communication, such as Wi-Fi, Bluetooth, a cellular network, GPS, dedicated short-range communications (DSRC), etc. With respect to the driver-facing video cameras 254 that monitor the driver, such monitoring can be done by any known techniques for measuring eye and head movement, including but not limited to tracking eye movements, micro-movements of the eye, head movements, and other means of measurement provided for herein or otherwise known to those skilled in the art.

The first hub 244 can transmit information it receives to the ECU 242 by any known means for communication as well, and in the illustrated embodiment it does so by way of Ethernet 243. In the illustrated embodiment, the second hub 256 transmits information it receives via Ethernet 245 as well, although other means of communication can be used, and further, in alternative embodiments, the second hub 256 can be configured to communicate directly to the ECU 242 rather than to the first hub 244.

Each of a third mini-switch or hub 262 and a fourth mini-switch or hub 264 can likewise receive information from other components of the vehicle. As shown, the third hub 262 receives from a second powertrain module 266, a second body control module 268, a second chassis and/or safety module 270, and one or more front video cameras 272, and the fourth hub 264 receives information from a third body control module 274 and one or more rear video cameras 276. In the illustrated embodiment, the second powertrain module 266, the second body control module 268, and the second chassis and/or safety module 270 are combined into a single module. While the third and fourth hubs 262 and 264 can likewise transmit information they receive to the ECU 242 by any known means for communication, in the illustrated embodiment each does so by way of Ethernet 247 and 249, respectively.

Further, an IVI center/system 278, also referred to as an infotainment center/system or entertainment center/system, or center stack, among other names known to those skilled in the art, can also communicate with the ECU 242. The IVI center/system 278, as well as other components of the present disclosure, such as the instrument cluster 246, may more generally be referred to as in-vehicle displays, which encompass any components that displays information to a user related to the user's operation of the vehicle. Accordingly, in some instances, in-vehicle displays can be provided by outside objects, such as smartphones and the like. In the illustrated embodiment, the IVI center/system 278 communicates with the ECU 242 directly via Ethernet 251, although in other embodiments it can be run through a mini-switch or hub, for example, and/or by other means of communication known to those skilled in the art. As shown, the IVI system 278 can communicate outside of the vehicle 201 as well, to another portion of the ecosystem for example, using components such as GPS 280, satellite 282, antenna (not shown) or other means of communication. Some exemplary IVI systems include but are not limited to: Ford SYNC, Ford MyFordTouch, Audi Multi-Media Interface, BMW iDrive, Lexus Remote Touch, Mercedes-Benz Command APS, Toyota Entune, Kia Motors UVO, Cadillac CUE, Chevrolet MyLink, Hyundai Blue Link, Fiat Chrysler Uconnect, and Fiat Chrysler Blue&Me. In some embodiments, the IVI center 278 can use the telemetry module 260 to communicate outside of the environment of the vehicle 201 and/or can communicate through other in-vehicle displays (e.g., the instrument cluster 246, speakers, microphones, etc.).

Still further, additional information can be provided to, and/or by, the ECU 242 by way of one or more additional devices. In the illustrated embodiment the additional devices are shown as a smartphone 284 and a computer 286, which can be communicatively coupled (e.g., tethered) to the ECU 242 by way of a link 253 to communicate with the vehicle 201 and the components illustrated in FIG. 3 or otherwise provided for herein or known to those skilled in the art. The link 253 can be achieved using many different means of communication, including but not limited to Universal Serial Bus (USB), Wi-Fi, and Bluetooth. The additional devices can often be devices provided by the operator of the vehicle 201, although in some instances the devices may be provided by a third party, such as a passenger of the vehicle 201, another person near the vehicle 201, the manufacturer or other supplier of the vehicle or its components, and/or another component of the ecosystem or vehicle 201.

As shown, the ECU 242 can be generally associated with the vehicle 201 by way of a data link connector 288 (e.g., OBD DLC Connector), including is associated wiring 255. The data link connector 288 can be a multi-pin diagnostic connector port that allows the ECU to be powered by the vehicle 201. It can include a vehicle scan tool to interface with the identified components or control modules tied to the ECU 242, and can access on-board diagnostics and live data streams, among other information. The scan tool associated with the data link connector 288 can be used, for example, to diagnose and/or reprogram the various modules associated with the ECU 242.

A person skilled in the art will understand how the various modules and components associated with the vehicle network 240 operate, and thus detailed explanations of the particular modules and components is unnecessary. By way of example, a person skilled in the art will understand the various information that can be provided by and/or monitored by the instrument cluster 246 without detailing how a speedometer, an odometer, a fuel measuring gauge, and their related components, sensors, etc., operate.

Figure 4:
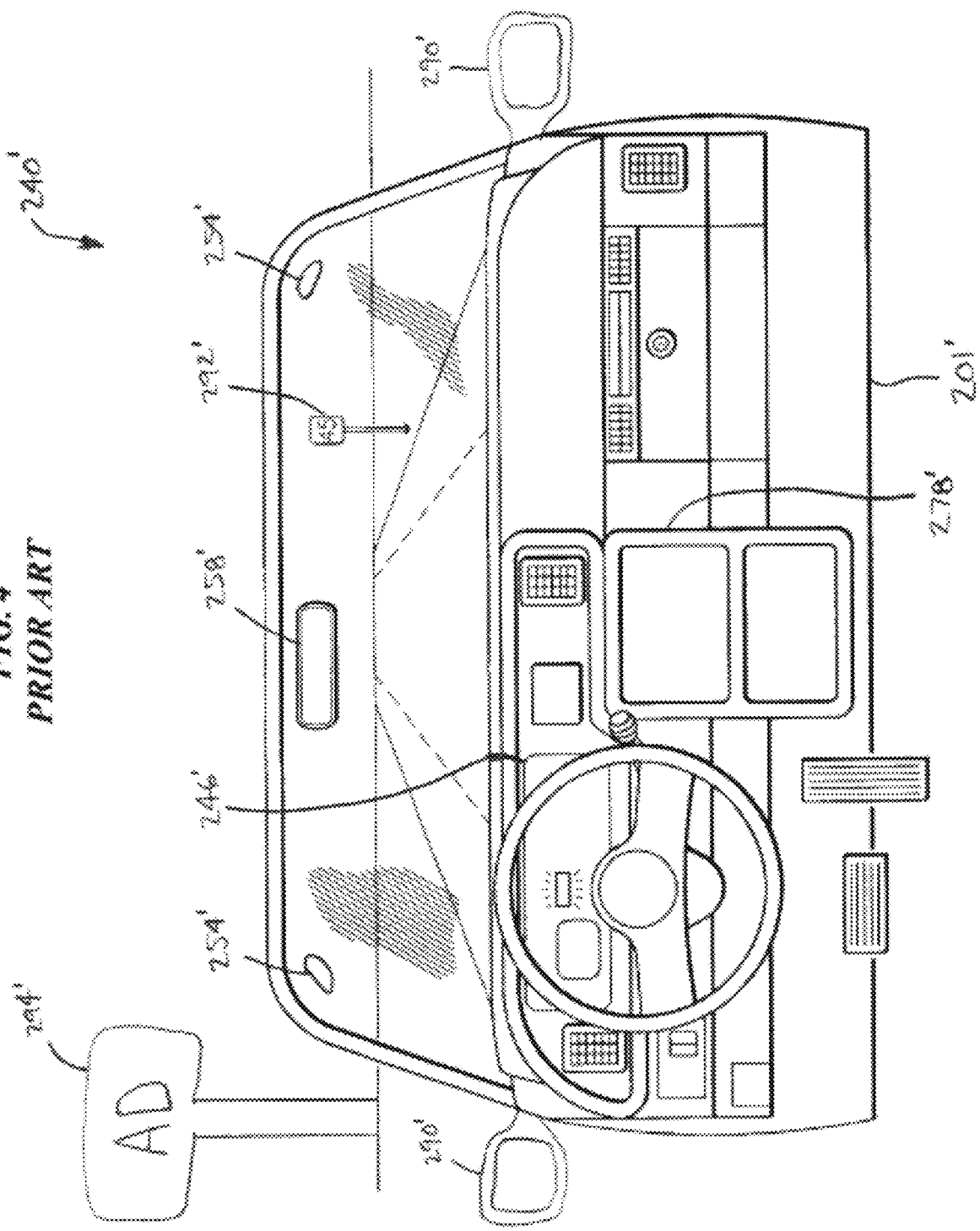
FIG. 4 is a schematic illustration of a view of a portion of an interior cab of a vehicle and a portion of an environment outside of the vehicle when viewed from the interior cab, the vehicle being one in which visual allocation management systems and methods as provided for herein can be incorporated.

FIG. 4 illustrates some aspects of a visual allocation management system, e.g. the visual allocation management system 103, provided for in conjunction with a vehicle 201'. As shown, the vehicle 201' includes in-vehicle displays such as an instrument cluster 246' and an IVI center 278', as well as a rear view mirror 258', side view mirrors 290', and two driver-facing cameras 254', each of which can be used to assist in monitoring the vehicle 201' and its operator during operation of the vehicle 201'. A person skilled in the art will understand how these various components and modules, and other components and modules not specifically labeled or illustrated in FIG. 4 but known by those skilled in the art as components and modules that can provide additional information to a vehicle network 240' that includes the vehicle 201', can be operated. These components and modules include, but are not limited to, the types described with respect to FIG. 3. By way of non-limiting example, the two driver-facing cameras 254' can be operated to detect glance frequency, locations, and durations of the driver, and a processor associated therewith can be operable to analyze such locations in accordance with the disclosures provided for herein. Further, although in the illustrated embodiment there are two driver-facing cameras 254', a person skilled in the art will recognize many other camera configurations can be used to monitor a driver, such as a single camera associated with the rear view mirror 258', and any number of cameras can be used. Still further, in some embodiments, whether cameras are included or not, other tools, devices, components, etc. can be used to monitor a driver. By way of non-limiting examples, sensors embedded or otherwise associated with the body (e.g., near or on the eye) and/or devices used to monitor brain waves and/or other neuro functions and pathways to determine information about the driver, such as where the driver is looking, for how long, how aware the driver is of outside objects, if the driver is paying attention to what he or she is looking at, etc.

Also shown in FIG. 4 are various places where a glance may be located, some of which are informative and/or helpful to the operation of the vehicle by the vehicle operator, and others which are not helpful. For example, a speed limit sign 292' can be subject to an off-road glance (described in greater detail below) that may be considered informative to the situational awareness of the driver, while an advertisement billboard 294' can be subject to an off-road glance that may not be considered informative to the situational awareness of the driver. As provided for herein, the type of off-road glance can impact how the visual allocation management system 103 processes the glance and operates the provided for algorithm. Likewise, the duration of on-road glances can impact how the visual allocation management system 103 processes the glance and operates the provided for algorithm. FIG. 4 helps provide context to what are described herein as on-road and off-road glances.

Managing Visual Allocation

Figure 5:
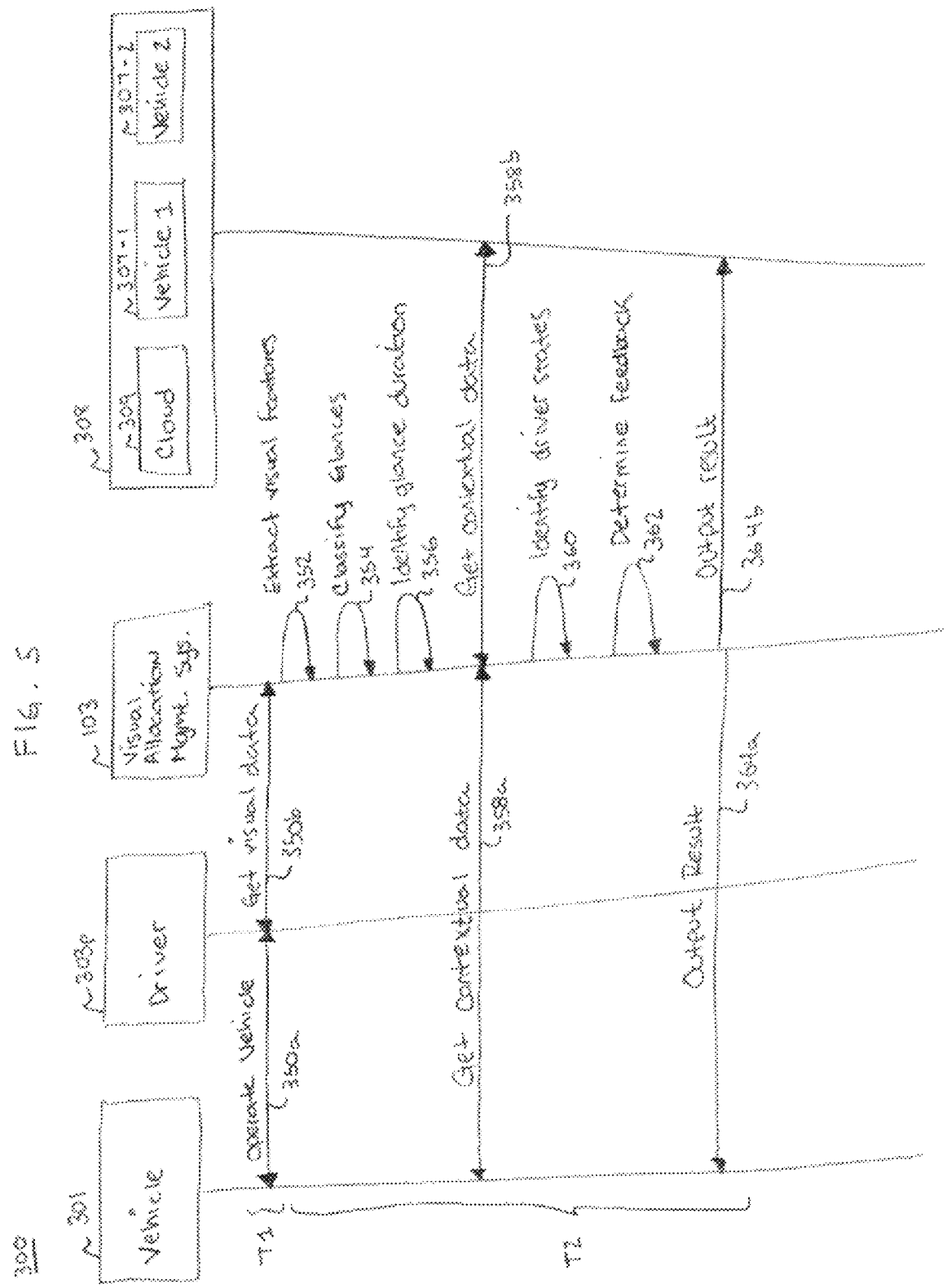
FIG. 5 is a sequence diagram illustrating one exemplary embodiment of a visual allocation management process using the visual allocation management system of FIG. 1.

FIG. 5 is a sequence diagram illustrating one exemplary process 300 for managing visual allocation using the visual allocation management system 103. In the process 300, the visual allocation management system 103 is embedded or built into a vehicle 301 operated by a driver 303p. The visual allocation management system 103 is communicatively coupled to and communicates with a cloud 309, system 307-1, and a system 307-2 (collectively referred to herein as "systems 308" or "308"), to, among other things, (1) exchange contextual information used by the visual allocation management system 103 to perform more contextually aware visual allocation management, and (2) provide outputs (e.g., feedback, instructions) based on the visual allocation management. In the process 300, the systems 307-1 and 307-2 are vehicles located proximate to the vehicle 301, and the cloud 309 is a smart traffic cloud managed by a traffic management system that can collect and manage traffic data, traffic strategies and the like. A person of skill in the art will understand that the systems 308 can include any number and type of systems, objects, and devices.

In the process 300, the system 103 provides real-time management of visual allocation, meaning that the system 103 can provide outputs such as feedback or instructions within a time period sufficiently short such that the output can be effectively applied. In some embodiments, real-time means that the time from which data (e.g., driver's visual data, contextual data) is collected to the time that feedback, instructions, or other data is output is in the order of milliseconds or microseconds, and may also be understood to be "near real-time." It should be understood that such time guarantees or requirements from input to output (or request to response) can vary based on the type of input or output. For example, real-time visual allocation management resulting in the output of a brake control instruction to a vehicle can be faster, or subject to more lenient immediacy requirements, than real-time visual allocation management resulting in the output of a warning about potentially distracted driving. In some embodiments, visual allocation management can be provided other than in real-time, for example, in less time critical applications including examples presented herein such as advertising, quality assurance, training, and the like.

Steps 350a and 350b, which will now be described in further detail, occur during a first time period T1, and steps 352 to 366a and 366b occur during a second time period T2. As described above, the visual allocation management process 300 occurs in real-time, meaning that the amount of time from the start of time period T1 to the end of the time period T2 can be nearly instantaneous, in the order of, for example, less than a microsecond, less than a millisecond, or less than a second.

At step 350a, the driver 303p engages in the driving of the vehicle 301 and, at step 350b, the visual allocation management system 103 obtains visual data of the driver 303p engaging in the driving of the vehicle 301. As known to those of skill in the art, the amount of time T1 during which the driver 303p is engaged in the driving of the of the vehicle 301 can be of any length, but is at least long enough to correspond to more than a single glance performed by the driver 303p. Naturally, during the driving of the vehicle at step 350a, the driver 303p can engage in a variety of activities that require different visual allocations. It should be understood that visual allocation refers to the visual behavior or direction of the glance of the driver 303p at a given time during the driving of the vehicle 301. For example, a driver's visual allocation when changing a song can be in the direction of the IVI center, or when switching lanes can be in the direction of a side mirror.

In the process 300, as the driver 303p drives the vehicle 301, the visual allocation management system 103 captures visual data of the driver, namely, the visual allocation of the driver 303p, at step 350b. Capturing the raw visual data or visual allocation of the driver 303p is performed using one or more cameras (e.g., video camera, still image camera) corresponding to the management system 103 (e.g., the cameras 254' illustrated in FIG. 4). As known to those of skill in the art, the cameras of the visual allocation management system 103 can be positioned in different areas of the vehicle (e.g., dashboard, console, rear view mirror, side mirrors, etc.) such that the driver's eye region (e.g., one or two eyes, open or closed eyes, eye area when driver is wearing sunglasses) is visible and able to be captured from a variety of angles. For example, the cameras can be positioned to capture the driver's entire head and upper torso with sufficient margins to allow the head or face to remain in view while the driver performs normal or anticipated types of movements.

In some embodiments, the visual allocation management system 103 can use cameras of the vehicle 301, which are communicatively coupled to the visual allocation management system (e.g., using short-range communication protocols such as Bluetooth) to capture the visual data or visual allocation of the driver 303p at step 350b. The captured visual data can be stored for further processing by the visual allocation management system 103 to provide management of the visual allocation as described herein. The captured visual data can be stored in a memory of or communicatively coupled to the visual allocation management system 103, such as a built-in memory, a memory of the vehicle 301, or a memory of any of the systems 308 (e.g., cloud 309).

It should be understood that, while in the process 300 the visual data of the driver 303p is captured using cameras, in other embodiments, the visual data can be obtained using other techniques such as response-request to/from interconnected devices; data obtained from sensors that measure, for example, eyelid movements, eye or face muscle movements, brain waves, and the like; thermal or acoustic imaging (or using other forms of energy).

In turn, at step 352, visual features are detected and/or extracted by the visual allocation management system 103 from the visual data captured at step 350*b* of the driver 303*p* operating the vehicle 301. In some embodiments, visual data can be down-sampled to an optimal or preferred frames per second (fps) rate (e.g., 10 fps to 50 fps) deemed sufficient to accurately represent the visual behavior or allocation of the driver 303*p* while removing unnecessary data. Down-sampling can also allow the visual allocation management system to process visual data in a standard or uniform way, such that visual allocation management results can be more accurate.

Still with reference to the visual feature extraction of step 352, in some embodiments, the visual data can be segmented into portions of a certain length or size. That is, videos or image captured can be divided into epochs of, for example, 0.1 seconds, between 0 and 1 second, 1 second, and 5 to 10 seconds of length. Segmenting the video also enables more uniform and consistent visual allocation management by the system 108. The resulting down-sampled and/or segmented visual data is therefore an eye image sequence made up of images or frames of the eye region of the driver 303*p* during the driving of the vehicle 301. Each of the images or the eye image sequence can be processed as follows in connection with FIG. 6 to identify and/or extract the visual features.

Figure 6:
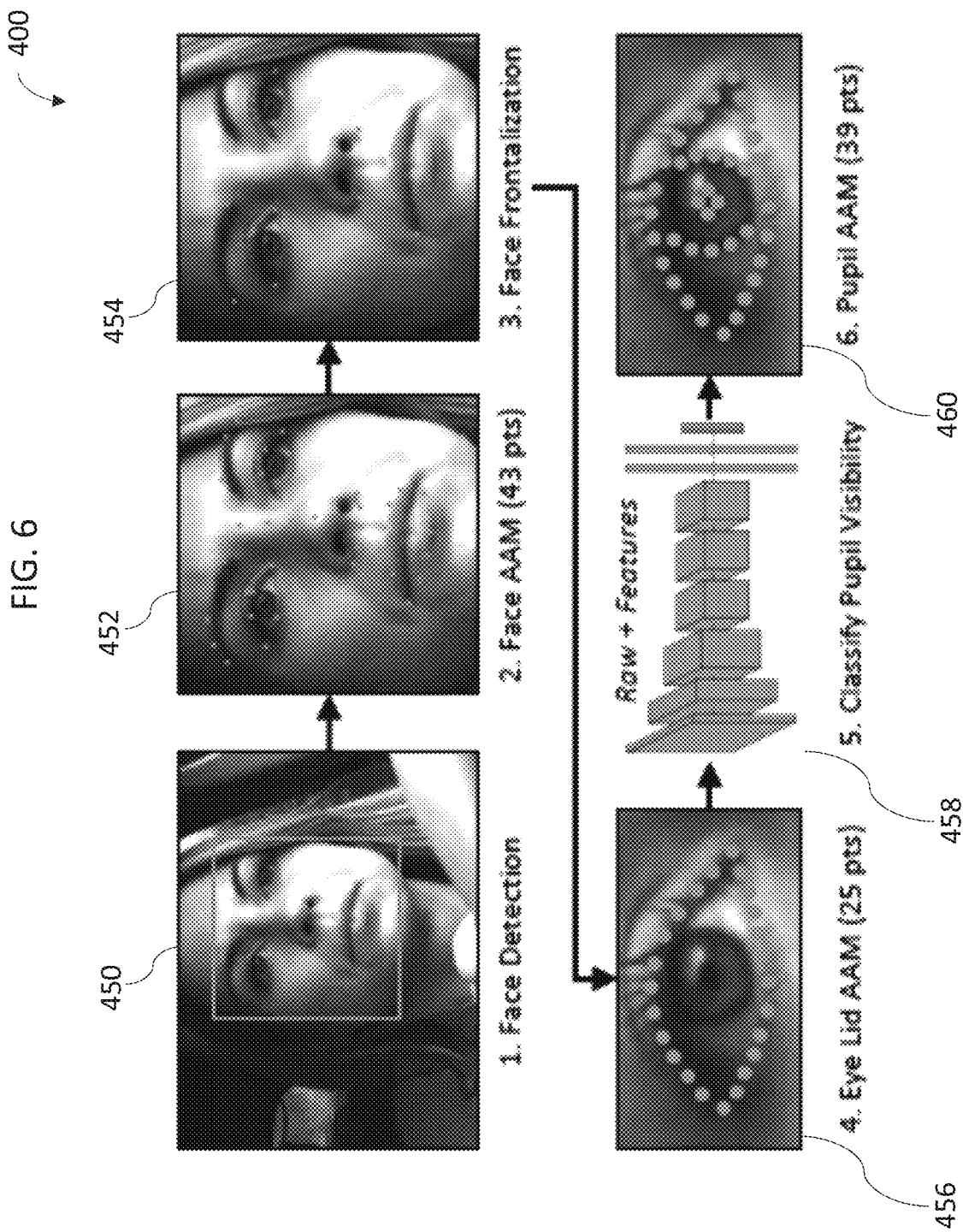
FIG. 6 is a diagram illustrating one exemplary embodiment of a visual feature detection in the visual allocation management process of FIG. 5.

FIG. 6 is a diagram illustrating an exemplary embodiment of a visual feature detection process 400. As shown in FIG. 6, at step 450, face detection is performed on each image of the eye image sequence. As known to those of skill in the art, face detection can be performed using a variety of imaging and face detection algorithms and techniques (e.g., Haar-feature based face detection available in OpenCV). In some embodiments, face detection uses a histogram of oriented gradients (HOG) combined with a linear SVM classifier, an image pyramid, and a sliding window detection scheme. Underlying these approaches illustrated in FIG. 6 is a machine learning mechanism that is trained on an annotated dataset of faces. The training process forms a representation of features that define the distinction between a classification of a "face" versus "not a face." As known to those of skill in the art, different machine learning algorithms and/or features can be employed, and can vary based on the particular application.

In turn, once the face has been detected at step 450, the detected face of the driver 303*p* is aligned at step 452. Likewise, a person of a skill in the art will understand that face alignment on an image can be performed using a variety of alignment algorithms and techniques. In some embodiments, at step 452, the face alignment is performed by identifying a three-point facial landmark including portions of the eyes, eyebrows, nose, and mouth of the driver 303*p*. A computer vision algorithm, such as an active appearance model (AAM) optimization algorithm, can use a cascade of regressors to align the 43-point shape to the image data. It should be understood that other computer vision algorithms that can match a model of an object shape (e.g., face, eye lid, pupils) to a new image (e.g., image from image sequence of driver) can be used, as known to those of skill in the art. While both eye regions can be identified and extracted from the image, in some embodiments only the eye region corresponding to a single eye is selected as an input for the visual allocation management process descried herein. When selecting the eye region of a single eye, in some embodiments the eye region corresponding to the eye closest to the camera, as determined based on real-world coordinates estimated from the image using techniques known to those of skill in the art, is selected for visual allocation management. To do so, the aligned features of the face are mapped to a generic or standard (pre-stored and/or predetermined) three-dimensional model of a human head and face. The resulting point correspondence (e.g., three-dimensional and/or two-dimensional) is used to compute the orientation of the head and/or face of the driver 303*p*.

The identified 43 fiducial points and the selected eye region can be used to perform face frontalization at step 454. Face frontalization is performed to synthesize a frontal view of the face of the driver 303*p*, thereby also frontalizing the eye region. In some embodiments, at step 456, an AAM optimization algorithm or the like is performed on the eye lids of the eye selected eye region of the image of the eye image sequence. At step 458, the aligned points and the raw image are loaded or input into a neural network (e.g., two-dimensional convolutional neural network (CNN) with 3 convolutional layers and two fully connected layers) to predict the visibility state of the pupil as it relates to the occlusion caused by the blinking action of the driver 303*p*. In other words, a neural network can be used to determine whether the eye in the eye image of the eye image sequence are deemed to be sufficiently open for the pupil to be visible. If the pupil is deemed visible enough to continue the visual allocation management process, an AAM optimization algorithm or the like is performed at step 460 using 39 image points, which include 14 points that identify or localize the iris and the pupil. It should be understood that the number of points used for optimization algorithms in connection with FIG. 6 can vary, depending, at least in part, on the number of points deemed optimal or necessary as known to those of skill in the art.

The result of the visual feature extraction performed at step 352 is an estimation of the pupil position in each image of the image sequence of the driver 303*p* operating the vehicle 301. In some embodiments, pupil position can be normalized using the magnitude of the line segment between the two corners of the eyes, also referred to as the "intraocular line segment." In such cases, the midpoint of the intraocular line segment is used as the origin. The pupil position is made up of x and y coordinates, based on an x-axis equivalent or parallel to the intraocular line segment, and a y-axis perpendicular to it. When a pupil position is not visible in an image, the last in time, or previous pupil position, is assigned to that image, or a baseline (0,0) position is assigned.

It should be understood that the pupil position, which is measured relative to the intraocular line, can indicate or be used to calculate or determine a glance direction and/or target viewing area (e.g., region of windshield, side mirrors, in-vehicle display(s)) or object. A glance can correspond to a single image in the image sequence, or to multiple images in the image sequence. Thus, at step 354, the pupil position or glance direction of each image of the image sequence can be classified or mapped to predetermined spatial regions. In some embodiments, spatial regions are predetermined and are associated with corresponding pupil positions. Non-limiting examples of spatial regions include: left mirror, instrument cluster, forward road, rearview mirror, center stack, right mirror, left blind spot, passenger seat, right blind spot, unknown, and other. It should be understood that glances or pupil positions can be mapped to any number of spatial regions, and the spatial regions can be of any size and location, as well as associated with any object, component, device, element, or combination thereof.

In some embodiments, at step 356, the visual allocation management system 103 identifies the duration of each glance. As indicated above, depending on the length of a glance, the glance can correspond to one or multiple images in the eye image sequence. In some embodiments, the duration of each glance is calculated by comparing the timestamp of the first image in a glance, with the first image in a next glance. Their difference is equal to the duration of the glance. As described in further detail below, visual allocation management can be performed, for example, using the direction of the glance as well as the duration of the glance.

At steps 358a and 358b, the visual allocation management system communicates with (1) the vehicle 301 and (2) the systems 308 (e.g., cloud 309, vehicles 307-1, 307-2), respectively, to obtain contextual or supplemental information to be used during the visual allocation management and generation of a result therefrom. In some embodiments, the contextual information can be used to provide more effective and accurate calculations, thereby also enabling more effective outputs (e.g., feedback, instructions). As known to those of skill in the art, the contextual information can be virtually any type of data that can be used to more accurately predict or estimate the behavior of the driver 303b during the operating of the vehicle 301 at time T1. Non-limiting types of contextual data include environment data (e.g., weather, road conditions) regarding the environment in which the vehicle 301 is located, surrounding data (e.g., information regarding nearby vehicles, obstacles, structures, roads, and the like) regarding the surroundings of the vehicle 301 within a given radius, and user data (e.g., age, gender, heart rate, body temperature) regarding the driver of the vehicle 301. Other non-limiting examples of contextual information include: vehicle speed, vehicle weight, fuel levels, driving patterns, headlight state, position (e.g., relative to surrounding vehicles or obstacles), driver data, radio volume, and the like, collected by and/or received form the vehicle 301; vehicle speed, vehicle weight, fuel levels, driving patterns, headlight state, position (e.g., relative to the vehicle 301), and the like, collected by and/or received from the vehicles 307-1 and 307-2; traffic data, weather data, event data, road data, and the like, received from various types of clouds 309, such as clouds managed by or corresponding to city or state governments, traffic management entities, weather data providers, and the like. Other examples of contextual data includes data corresponding to the driver 303p, such as skin temperature, heart rate, movement, sound, and the like. As described above in detail with reference to FIG. 1, the contextual data can be obtained by each system, for instance, using corresponding sensors attached or coupled thereto, and transmitted to the visual allocation management system 103 either periodically, or in response to a request for contextual data.

In turn, at step 360, the visual allocation management system 103 uses the visual data and the contextual data to predict, infer or calculate the state or states (or behavior, activity or task, or set thereof, in which the driver 303p is engaged) of the driver 303p during the operation of the vehicle 301 at time T1. As described above, the visual data can include glance direction (e.g., based on pupil position, if available; and/or based on facial features, thermal or acoustic imaging, etc.), glance duration, and transitions of glances identified by the visual allocation management system from the images of the eye image sequence. To predict the state of the driver 303p, the visual allocation management system 103 compares the visual data and/or the contextual data to statistical models (e.g., Hidden Markov Models (HMMs)) of target or candidate states (e.g., behaviors, tasks, activities, strategies). Although statistical models and HMMs are discussed in connection with the process 300, a person of skill in the art will understand that other models and artificial intelligence tools can be used, including those examples described herein, as well as those known to those skilled in the art in view of the present disclosures. By comparing the visual data to the statistical models, the visual allocation management system 103 can calculate the probability that the behavior or state of the driver 303p during T1 matches the states of the statistical models. The use of statistical models to predict the state of the driver 303p that is performed at step 360 is now described in more detail.

As mentioned above, the visual and/or contextual data of the driver 303p is compared to pre-stored statistical models, such as HMMs, of human states (or behaviors, activities, tasks, and the like). It should be understood that the states corresponding to the statistical models can vary depending, at least in part, on the use and application of the visual allocation management system 103. For instance, in the process 300, the modeled states are in-vehicle, traditional driving activities, though pseudo-traditional activities can also be modeled for less common behaviors. Non-limiting examples of the modeled states include interacting with the in-vehicle displays of the vehicle 301 (e.g., navigation, phone contact calling, radio tuning, alternative music selection), using portable technologies (e.g., GPS devices, smartphones), engaging in partially-automated driving (e.g., Society of Automotive Engineers (SAE) driving automation levels 1, 2, 3), drowsy driving, attentive driving, and the like. As understood to those of skill in the art, the granularity of states can vary as deemed optimal or necessary by the visual allocation management system 103, ranging from broad states, such as "highway driving," to more narrow states, such as "attentive highway driving without the presence of a secondary load (e.g., radio tuning). Moreover, it should be understood that the modeled state can correspond to a specific task, behavior, or activity, such as "radio tuning," or a strategy that can be made up of multiple behaviors or activities, such as "attentive highway driving while tuning a radio." In some embodiments, states or strategies can be referred to as "target states" or "target strategies," which refer to states or strategies that are encouraged by the visual allocation management system 103.

The states can be statistically modeled to account for a single feature, such as glance direction, or for multiple features, such as glance duration and glance transitions, and/or using features or attributes derived from the contextual data.

The statistical models can be built, trained, and stored by the memory of the visual allocation management system 103. In some embodiments, the statistical models can be centrally and remotely stored in the cloud 309, which can be a cloud managed by a visual allocation statistical model management company. The stored statistical models can correspond specifically to the driver 303p, meaning that they model the behavior specifically of the driver 303p. That is, because the driver 303p can perform an activity or behavior in a way that results in different visual allocation or attention than another person, the statistical model of the driver 303p would be different for that particular activity or behavior than the statistical model of the other person. Such a model could, in some instances, be deemed to be more uniquely tailored and therefore more accurate. Nonetheless, in some embodiments, the statistical models of each state can be based on aggregated and normalized data of multiple individuals engaged in the activities or behaviors of each state.

Such an approach, while less individualized, can be more flexible such that it can identify more variations of the existence of a given state.

As described above, the stored models are first generated and trained. In some embodiments, the models are built and trained prior to executing the process 300, and/or before and during the process 300. In other words, the models can be pre-trained and/or can continuously be re-trained based on newly acquired data, including the visual and/or contextual data acquired in the process 300. A person of skill in the art will understand the many ways in which models can be trained. Nonetheless, in the process 300, the statistical models can be trained using the process described in connection with steps 350a to 358b. In some embodiments, training data is captured and/or used merely for the purpose of training the statistical models. The training data is obtained from training scenarios in which state data representing the state or states (e.g., activity, behavior) of the driver of the vehicle is known or able to be accurately determined. For instance, a number of training scenarios are executed in which individuals engage in a variety of activities and behaviors and, in the meantime, their visual data is captured, such that the attributes (e.g., visual behavior) exhibited by the individuals during the execution of the activity or behavior can be accounted for in the trained statistical model. The captured visual data, and/or other contextual data, can be used to build and train the statistical models.

Figure 7:
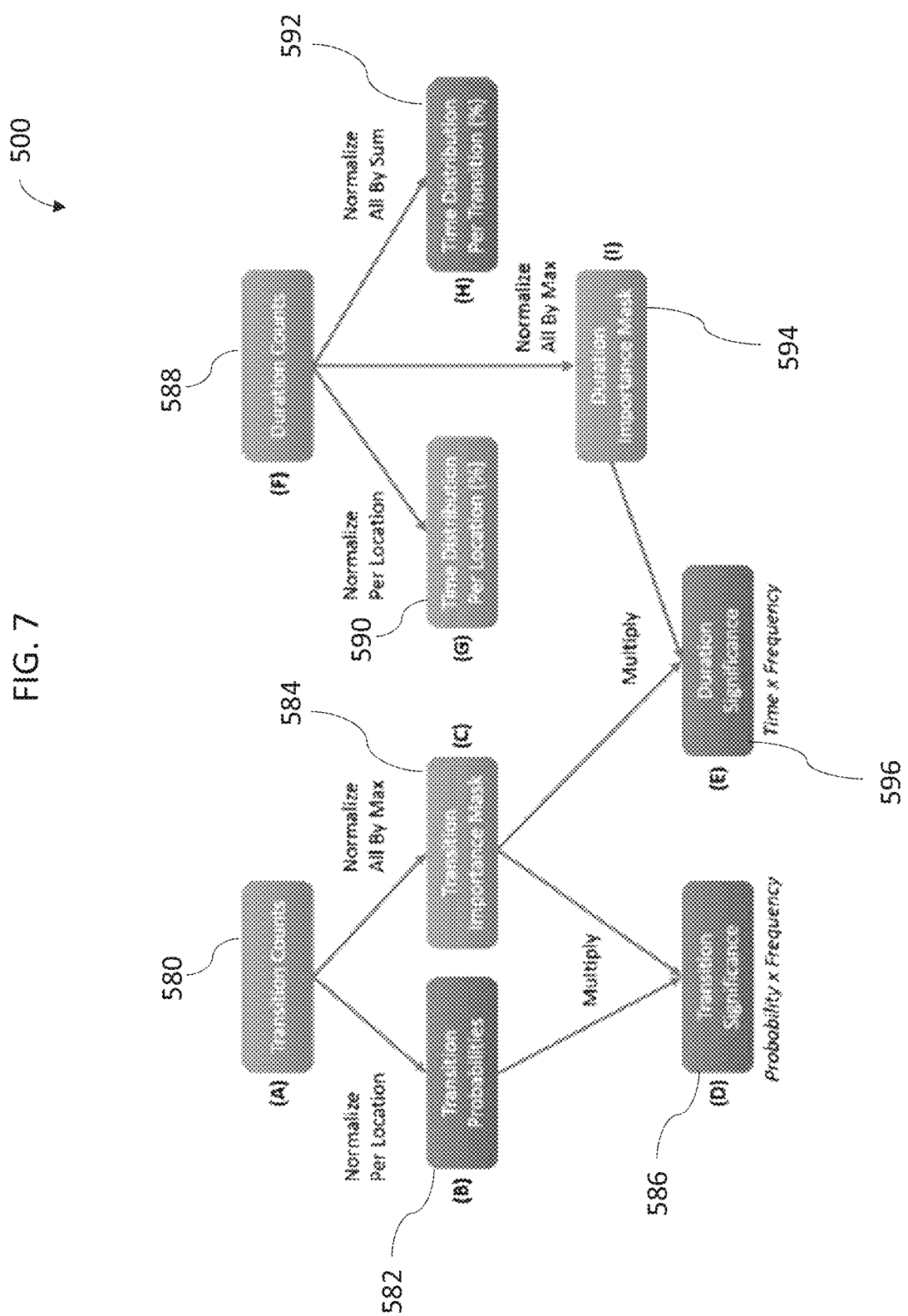
FIG. 7 is a diagram illustrating exemplary embodiments of visual data representations for building models for predicting states in the visual allocation management process of FIG. 5.

As known to those of skill in the art, the stored models can be built and trained using the raw visual and/or contextual data, or using transformations of that data. FIG. 7 is a diagram 500 illustrating examples of data transformations and/or representations, which can be used to build and train the models corresponding to each state. In FIG. 7, each node corresponds to a data (e.g., visual data) representation in the form of a mathematical structure (e.g., matrix, vertex, array, table) and the arrows between the nodes correspond to a data operation. Although in FIG. 7 matrices relating to glance transitions and glance durations are provided, it should be understood that the statistical models described herein can be based on a single type of attribute, such as glance transitions or durations. The nodes of FIG. 7 include:

Transition Counts (580): The Transition Counts matrix represents how many times, in an eye image sequence or visual data, glances progress from an allocation at a location or spatial region J to a location or spatial region K for all location pairs.

Transition Probabilities (582) The Transition Probabilities matrix represents the normalized values for each location or spatial region. Normalizing the transition counts by location or spatial region can be calculated, for example, using the formula: P(current glance=K|previous glance=J). The Transition Probabilities matrix indicates, for any given glance region, the relative frequency that glances transition to another defined region. For each cell in the matrix, the value of the matrix can be obtained by dividing the transition count value (e.g., from the Transition Counts matrix (580)) of that cell by the row sum which represents the total number of transitions from one location to all other locations. In other words, given a set of glances organized as a time series corresponding to a state, activity, task or behavior, the number of transitions from location J to location K (node 580) is divided by the total number of transitions out of location J. Thus, the Transition Probabilities matrix indicates the probability of transitioning from a given location or spatial region to another location or spatial region.

Transition Importance Mask (584): The Transition Importance Mask matrix is obtained by dividing the transition count value (e.g., from the Transition Counts matrix (580)) of a cell by the maximum value of a cell in the respective row (e.g., the cell with the largest number of transitions away from a region (in the Transition Counts matrix)). This matrix accounts for the fact that, in some instances, a single glance transition associated with an infrequently visited region of interest can result in a high transition probability, while regions frequently visited would represent a more stable probability prediction.

Transition Significance (586): The Transition Significance matrix is calculated using element-wise multiplication of the Transition Probability matrix (582) and the Transition Importance Mask matrix (584). In the Transition Significance matrix, high-intensity entries mark transition that are not only probably, but that also appear often in the underlying visual data.

Duration Counts (588): The Duration Counts matrix represents the duration of a transition from a glance direction or location K to a glance location or direction J, which can be defined as the duration of the glance at location K before switching to glance location J. The Duration Counts matrix includes or represents this result for all locations J, K. In this way, each transition can be weighted with the magnitude of its duration.

Time Distribution Per Location (%) (590): The Time Distribution Per Location Matrix is obtained by normalizing the Duration Counts matrix for each glance location, which yields the distribution of time spent across all locations as a function of the glance object.

Time Distribution Per Transition (%) (592): Normalizing the Duration Counts matrix by the sum of all entries yields the Time Distribution Per Transition matrix, which indicates the percentage of the total time across all states or tasks and subjects that was spent in each type of glance.

Duration Importance Mask (594): The Duration Importance Mask highlights whether large amounts of time allotted to a particular movement type are the result of few, long duration glances, or of many short duration glances. The Duration Importance Matrix accomplishes this by globally normalizing all duration count values. The Duration Importance Mask functions similarly to the Transition Importance Mask, but using duration counts instead of transition counts.

Duration Significance (596): The Duration Importance Mask matrix 594 is combined with the Transition Importance Mask matrix 584, using element-wise multiplication, to yield a duration significance map where high intensity values correspond to long duration glances that also appear frequently in the data. In some embodiments, the Duration Importance Mask matrix 594 can identify additional patterns, such as a pattern that the switch from high to low intensity is indicative of infrequent, long-duration glances; and that a switch from low to high intensity is suggestive of frequent, short-duration glances.

Figure 8A:
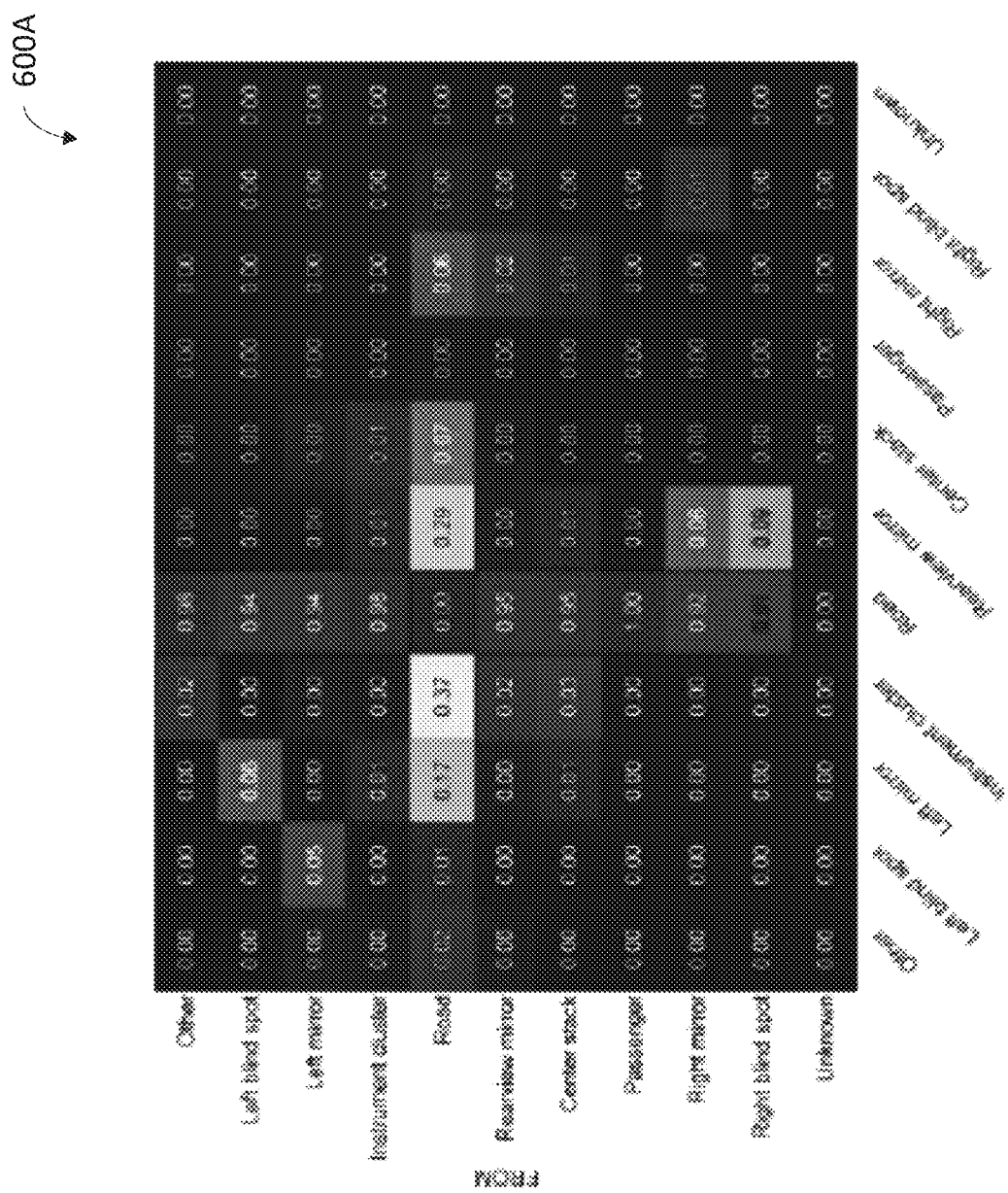
FIG. 8A is a matrix illustrating one exemplary embodiment of a transition probability matrix corresponding to a baseline driving state.
Figure 8B:
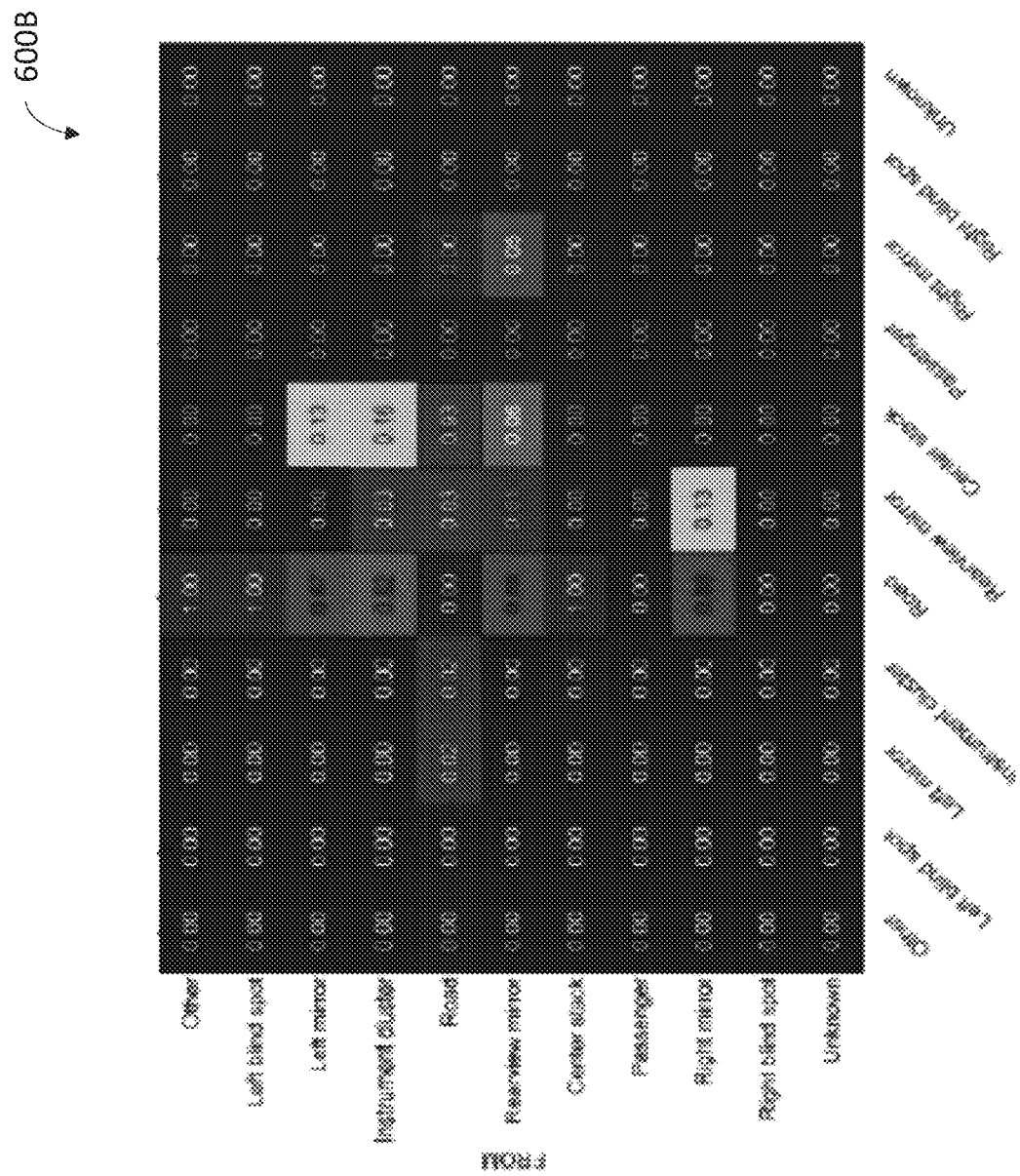
FIG. 8B is a matrix illustrating one exemplary embodiment of a transition probability matrix corresponding to a visual manual radio manipulation state.

The matrix representation described above in connection with FIG. 7 can be visually represented as shown in FIGS. 8A, 8B, and 8C. FIGS. 8A to 8C illustrate an example of Transition Probability matrices along the lines of matrix 582 described above, representing transition probabilities during multiple states or activities, namely baseline driving (600A), visual manual radio manipulations (600B), and auditory-vocal radio manipulations (600C), respectively. The y-axis represents predetermined spatial regions or locations in a vehicle (e.g., vehicle 301) from which a glance originates, and the x-axis represents the spatial regions or locations in the vehicle to which the glance transitions from its originating location. In FIGS. 8A, 8B, and 8C, high intensity entries represent transitions that are probable. As described above, a person of skill in the art will understand that any of the data representation matrices of FIG. 7 (and others not illustrated or described herein) can be used to build and train the models described herein.

Still with reference to step 360, the trained models, which correspond to respective states (e.g., behaviors, target strategies, etc.), are used to predict or infer the behavior, attention, or awareness of the driver 303p during the operation of the vehicle 301 at time T1, based on input visual data (e.g., glance durations, glance directions, glance transitions) and/or contextual information. The model that outputs the highest score is deemed to correspond to the state of the driver 303p during the driving of the vehicle 301 at time T1. In some instances, the scoring of the results of the comparison of the visual data of the driver 303p against the models is based on the probability that the visual data corresponds to the modeled state. The model that yields the highest probability is deemed to be the likely state of the driver at time T1. In other words, in some embodiments, the model among all of the stored models that produces the highest log probability for the input eye image sequence or visual data is selected as the most likely state of the driver 303p.

It should be understood that, in some embodiments, visual data and/or an eye image sequence can correspond to multiple states that are individually and independently modeled. In such cases, the visual allocation management system can identify the portions of the visual data that correspond to each state, likewise based on the models yielding the highest probabilities.

At step 362, the visual allocation management system determines an optimal or appropriate feedback based on the identified one or more states corresponding to the visual data obtained at step 350b in connection with time T1. As is described in detail below, the feedback is determined to, in turn, output it to or through connected systems, devices, components, or the like. In some embodiments, the identified feedback is intended to improve or otherwise affect the visual awareness or attention of the driver 303p, or to take, cause, or instruct actions that substitute or serve as proxies for the visual awareness or attention of the driver 303p.

In some embodiments, the appropriate feedback is determined based on predefined rules, thresholds, and the like, which can be stored by the visual allocation management system 103 and/or by an interconnected system, such as the vehicle 301, the cloud 309, or the vehicles 307-1 and 307-2. The identified feedback can be in the form of, for example, instructions, warnings, notifications, alerts, requests, responses, and the like. One example of feedback is an instruction type feedback that can result, for example, from (1) visual data that causes a model to identify the most probable state of the driver as being "drowsy highway driving," together with (2) contextual information from the vehicle 301 that indicates that the speed of the vehicle is more than 10% of the maximum allowed speed. In such a case, the visual allocation management system 103 can identify an applicable rule based on the input parameters of the visual and contextual data, namely, for example, an applicable rule that triggers the creation (and transmission) and/or execution of a vehicle control instruction that activates the vehicle 301 brakes and/or otherwise causes the vehicle 301 to reduce its speed such that the identified state can be corrected, dis-incentivized, discouraged, or otherwise affected. A person of skill in the art will understand the multitude of ways that an instruction type feedback can be triggered, and/or the rules that can be stored to trigger such a feedback.

Another non-limiting example of feedback is a warning type feedback that can result, for example, from visual data that causes a model to identify the most probable state of the driver as being "visual manual radio manipulation." In some embodiments, the visual allocation management system 103 need not consider contextual data when identifying a most probable state of the driver 303p, applicable rules, or optimal feedback. In such a case, the visual allocation management system 103 can identify an applicable rule that triggers the creation (and transmission) and/or execution of vehicle warnings, which can be made up of lights, sounds, vibrations and/or the like being activated within or in connection with the vehicle 301, such that the identified state of the driver 303p can be altered or at least alerted to the driver 303p. Of course, as known to those of skill in the art, the types and specifications of the lights and sounds can vary as deemed optimal or desirable.

Another non-limiting example of feedback is a target strategy type feedback that can result from, for example, visual data that causes a model to identify the most probable state of the driver as being an undesirable or subpar state (e.g., "distracted driving," "visual manipulation of radio in high traffic," and the like). In such a case, the visual allocation management system 103 can identify an applicable rule that triggers the creation (and transmission) and/or execution of vehicle control instructions, vehicle warnings, and/or the like that together can promote, encourage, incentivize, or otherwise attempt to direct the visual allocation of the driver 303p in accordance with, or similar to, the visual allocation or goal of the target strategy. For instance, in some embodiments, the goal of the target strategy may be to increase the driver's visual allocation to spatial regions corresponding to the side mirrors. To that end, the target strategy feedback can cause, for example, lights or the like to light up at or near the side mirrors, windshield regions, rear view mirrors, etc. at intervals deemed optimal. One example of such a target strategy would be made up for triggers to encourage the driver to perform a visual allocation pattern such as: center of windshield (1 to 2 seconds), left side mirror (0.1 to 0.25 seconds), center of windshield (1 to 2 seconds), left side of windshield (0.5 to 1 second), center of windshield (1 to 2 seconds), right side of windshield (0.5 to 1 second). Of course, such an exemplary pattern of a target strategy is presented for illustrative purposes. In some embodiments, patterns of target strategies can be generated to promote a set of glances across a broad range of spatial regions such that the driver can be seen as attentively scanning the environment.

It should be understood that target strategies can refer both to (1) a state or group of states (e.g., tasks, activities, behaviors) that are modeled and which can be compared against captured visual data, and (2) a policy to encourage certain visual allocation. Moreover, it should be understood that although examples of states described herein refer to undesirable states (e.g., drowsy driving, distracted driving), the visual allocation management system 103 and the visual allocation management 300 can also be used to characterize captured visual data of visual allocation or behavior as being positive and/or neutral. In other words, the stored models can include models for positive or neutral states. In the case of in-vehicle visual allocation management described herein, visual data can be used to characterize states of the driver 303*p*, for example, as attentive driving, aware driving, and/or adequate allocation of gazes across desirable spatial regions for appropriate amounts of time. Such positive or neutral feedback can be used, for instance, to enable or cause the vehicle 301 to enable other functionality (e.g., infotainment system) and/or to provide raises, awards, promotions and the like in professional driver settings.

Of course, a person of skill in the art will understand that the exemplary rules and feedback described herein are non-limiting and provided for the sake of illustration, and that the rules and feedback can vastly vary depending on the preferences of administrator or supervisory entities (e.g., of the vehicle 301 and/or the visual allocation management system 103).

In turn, at steps 364*a* and 364*b*, the visual allocation management system 103 can output the feedback (e.g., control instructions, warnings, etc.) to one or more of the vehicle 301 (and, thereby, the driver 303*p*), at step 364*a*, and the systems 308, at step 364*b*. The feedback can be transmitted and/or caused to be executed using the communication protocols and techniques described herein (e.g., Bluetooth, Wi-Fi), as well as others known to those of skill in the art. As mentioned above in connection with step 362, the feedback can be in the form of control instructions, audio-visual and sensory warnings and notifications, and the like. For example, in the event of captured visual data being recognized by the visual allocation management system 103 as corresponding to a distracted driving state, the visual allocation management system 103 can transmit control instructions to the vehicle 301 (or simply information that causes the vehicle 301 to generate and execute control instruction) to activate the brakes of the vehicle 301 to reduce its speed to a desired or optimal speed. Of course, feedback can also be transmitted to other interconnected systems not illustrated in FIG. 3. One such non-limiting example is the output of a warning to a wearable device (e.g., smartwatch) worn by the driver 303*p*, for instance, to alert the driver 303*p* of an undesirable identified state (e.g., drowsy driving).

As mentioned above, in some embodiments, the process starting at step 350*a* and 350*b* of operating the vehicle 301 and obtaining (e.g., capturing) visual data of the driver 303*p*, and proceeding through the output of feedback to the vehicle 301 or interconnected systems 308, can be performed in real-time. The immediacy of the real-time processing can depend on or be altered by, for example, the type of state that is identified and/or the identified optimal feedback. For instance, a recognized state of extremely distracted driving can trigger a control instruction to be output as feedback, which would require faster "real-time" processing as compared to a scenario in which the recognized state is deemed less critical. Of course, as known to those of skill in the art, in some embodiments, the visual allocation management can be performed other than in real time in non-critical scenarios such as training, simulations, testing, quality assurance, and the like.

Although not illustrated in FIG. 5, during and after the process 300, the visual allocation management system 103 can obtain or capture (e.g., continuously) the visual data of the driver 303*p* and contextual information. Likewise, the system can identify other states and feedback, and output the feedback during or after the illustrated visual management 300. For instance, in some embodiments, the visual allocation management system 103 can identify a feedback warning to transmit to the driver 303*p* via the vehicle 301, while simultaneously identifying another feedback (e.g., based on the same or different visual and/or contextual data) to output to the systems 301. Similarly, although not illustrated in FIG. 5, a person of skill in the art will understand that the models described herein can be trained prior to, during, or after the process 300. For instance, the models can be continuously trained based on, among other things, the accuracy of the drive state identification performed at step 360.

It should be understood that the process 300 relates to a single period of time during a driving sequence that can include any number (e.g., hundreds, thousands) of periods of times from which visual data can be obtained to provide visual allocation management. Thus, it should be understood that the process 300 can be repeated throughout all or a portion of the driving sequence, to provide (e.g., continuous) feedback.

Computer Implementation

Figure 9:
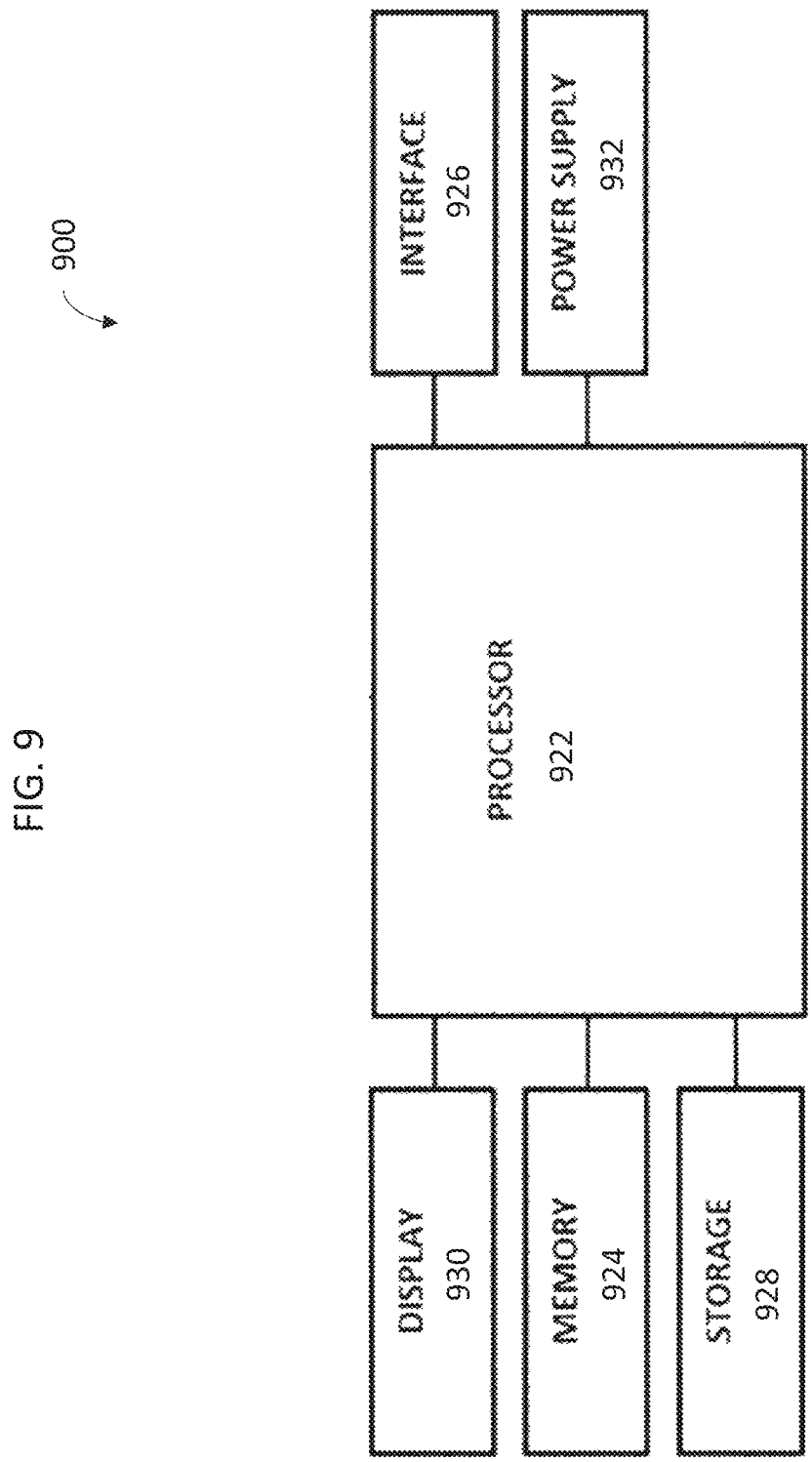
FIG. 9 is a schematic block diagram of one exemplary embodiment of a computer system for performing the visual allocation management of FIG. 5, among other disclosures and features provided for herein.

FIG. 9 illustrates a block diagram of the physical components of an exemplary embodiment of the controller, or computer, 900 that can include an a visual allocation management system 103 and/or execute visual allocation management described herein (e.g., FIG. 5, 300). Although an exemplary computer 900 is depicted and described herein, it will be appreciated that this is for sake of generality and convenience. In other embodiments, the computer 900 may differ in architecture and operation from that shown and described here. The computer 900 can be a tablet computer, mobile device, smart device, wearable device, smart phone, laptop computer, desktop computer, cloud-based computer, server computer, multiple of the above, and so forth.

The illustrated computer 900 can include a processor 922 that controls the operation of the computer, for example, by executing embedded software, operating systems, device drivers, application programs, and so forth. The processor 922 can include any type of microprocessor or central processing unit (CPU), including programmable general-purpose or special-purpose processors and/or any of a variety of proprietary or commercially-available single or multi-processor systems. As used herein, the term processor can refer to microprocessors, microcontrollers, ASICs, FPGAs, PICs, processors that read and interpret program instructions from internal or external memory or registers, and so forth. The computer 900 can include a memory 924, which can provide temporary or permanent storage for code to be executed by the processor 922 or for data that is processed by the processor. The memory 924 can include read-only memory (ROM), flash memory, one or more varieties of random access memory (RAM), and/or a combination of memory technologies. The various components of the computer 900 can be interconnected via any one or more separate traces, physical busses, communication lines, etc.

The computer 900 can include an interface 926, such as a communication interface or an I/O interface. A communication interface can enable the computer 900 to communicate with remote devices (e.g., other controllers or computer systems) over a network or communications bus (e.g., a universal serial bus). An I/O interface can facilitate communication between one or more input devices, one or more output devices, and the various other components of the computer 900. For example, the interface 926 can communicate with the computer components of a second computer (e.g., an integrated radio of the second computer). Exemplary input devices include touch screens, mechanical buttons, keyboards, and pointing devices. Additional exemplary output devices include a projector, electronic display screens, and speakers. The computer 900 can include a storage device 928, which can include any conventional medium for storing data in a non-volatile and/or non-transient manner. The storage device 928 can thus hold data and/or instructions in a persistent state (i.e., the value is retained despite interruption of power to the computer 900). The storage device 928 can include one or more hard disk drives, flash drives, USB drives, optical drives, various media disks or cards, and/or any combination thereof and can be directly connected to the other components of the computer 900 or remotely connected thereto, such as through the communication interface. The computer 900 can include a display 930, and can generate images to be displayed thereon. In some embodiments, the display 930 can be a vacuum fluorescent display (VFD), an organic light-emitting diode (OLED) display, or a liquid crystal display (LCD). The computer 900 can include a power supply 932 and appropriate regulating and conditioning circuitry. Exemplary power supplies include batteries, such as polymer lithium ion batteries, or adapters for coupling the computer 900 to a DC or AC power source (e.g., a USB adapter or a wall adapter).

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A system for managing visual allocation, comprising:
   at least one memory operable to store one or more models, the one or more models including at least one of:
   (1) a model corresponding to a plurality of candidate states; and
   (2) a plurality of models in which each model corresponds to one of the plurality of candidate states; and
   at least one processor communicatively coupled to the at least one memory, the at least one processor being operable to:
   receive visual data corresponding to a person engaging in an activity during a continuous period of time;
   identify a sequence of glances from the visual data and, for each glance in the sequence of glances, identify corresponding glance information, the glance information including a glance direction;
   classify each of the glances in the sequence of glances into a spatial region from among a set of predetermined spatial regions based on their respective glance information;
   identify, based on the one or more models, the presence of one or more states of the person while engaging in the activity during the continuous period of time by inputting into each of the stored one or more models model input data including one or more of (1) the classification of the glances in the sequence of glances and (2) the glance information of the glances in the sequence of glances; and
   output feedback based on the identified one or more states,
   wherein the at least one processor is further operable to identify, for each of the sequence of glances, one or more of a glance duration and a glance transition, the glance transition indicating the glance direction of a next glance in the sequence of glances,
   wherein the glance information of each of the sequence of glances further includes the one or more of the respective glance duration and glance transition, and
   wherein the identifying of the one or more states is further based on the one or more of the glance duration and the glance transition of each of the sequence of glances.

2. The system of claim 1, wherein the processor is further operable to:
   identify one or more eye image sequences in the visual data, the one or more eye image sequences including images of the eye region of the person engaging in the activity during the continuous period of time; and
   extract visual features from each of the images of the one or more eye image sequences,
   wherein the sequence of glances and corresponding glance information are identified from the one or more eye image sequences based on the extracted visual features.

3. The system of claim 2, wherein each of the one or more eye image sequences correspond to a single individual.

4. The system of claim 3, wherein the one or more eye image sequences in the visual data are captured using one or more cameras.

5. The system of claim 1, wherein, to identify the presence of one or more states at a given instance during the continuous period of time, the at least one processor is further operable to:
   calculate, by the one or more models, respective probabilities of the presence of each of the plurality of candidate states based on model input data; and
   select, as the identified one or more states, one or more of the plurality of candidate states having the highest respective calculated probabilities of presence at the given instance during the continuous period of time.

6. The system of claim 5, wherein the output feedback includes one or more of:
   (1) the probability of the presence of each of the plurality of candidate states during the continuous period of time;
   (2) the identified one or more states having the highest respective calculated probabilities of presence during the continuous period of time; and
   (3) instructions based on the identified one or more states of the person while engaged in the activity during the continuous period of time.

7. A vehicle comprising the system of claim 6,
   wherein the person engaging in the activity is a driver engaging in the operating of the vehicle,
   wherein the output feedback includes the instructions based on the identified one or more states, and
   wherein the instructions include one or more of:
   (1) instructions to manage the spatial attention or awareness of the driver of the vehicle,
   (2) instructions causing an impact on control of the vehicle, and
   (3) instructions to augment an exchange of information with at least one of the vehicle and the driver of the vehicle.

8. The vehicle of claim 7, wherein the instructions to augment an exchange of information with at least one of the vehicle and the driver of the vehicle comprise instructions to suppress an exchange of information to and from the vehicle.

9. The system of claim 1,
   wherein the at least one processor is further operable to identify one or more glance patterns from among the sequence of glances, based on the classification of each of the sequence of glances and/or the glance transitions of each of the sequence of glances, and wherein the identifying the presence of the one or more states is further based on the glance transition patterns input into each of the one or more models.

10. The system of claim 1, wherein the one or more models are Hidden Markov Models.

11. The system of claim 1, wherein the receiving of the visual data and outputting the result are performed in real-time.

12. The system of claim 1,
wherein the processor is further operable to receive contextual data from one or more communicatively coupled systems, and
wherein the identifying the presence of the one or more states is further based on the contextual data.

13. The system of claim 12, wherein the contextual data includes at least one of environment data, surrounding data, and user data.

14. The system of claim 1, wherein the at least one processor is further operable to:
train the one or more models using (1) visual data corresponding to a plurality of people engaging in the activity during continuous periods of time, and (2) state data including one or more states present in the plurality of people while engaging in the activity.

15. A method for managing visual allocation, comprising:
storing one or more models, the one or more models including at least one of:
(1) a model corresponding to a plurality of candidate states; and
(2) a plurality of models in which each model corresponds to one of the plurality of candidate states; and
receiving visual data corresponding to a person engaging in an activity during a continuous period of time;
identifying a sequence of glances from the visual data and, for each glance in the sequence of glances, identify corresponding glance information, the glance information including a glance direction;
identifying, for each of the sequence of glances, one or more of a glance duration and a glance transition, the glance transition indicating the glance direction of a next glance in the sequence of glances,
classifying each of the glances in the sequence of glances into a spatial region selected from among a set of predetermined spatial regions, based on their respective glance information;
identifying, based on the one or more models, the presence of one or more states of the person while engaging in the activity during the continuous period of time, by inputting into each of the stored one or more models model input data including one or more of (1) the classification of the glances in the sequence of glances and (2) the glance information of the glances in the sequence of glances; and
outputting feedback based on the identified one or more states,
wherein the glance information of each of the sequence of glances further includes the one or more of the respective glance duration and glance transition, and
wherein the identifying of the one or more states is further based on the one or more of the glance duration and the glance transition of each of the sequence of glances.

16. The method of claim 15, further comprising:
identifying one or more eye image sequences in the visual data, the one or more eye image sequences including images of the eye region of the person engaging in the activity during the continuous period of time; and
extracting visual features from each of the images of the one or more eye image sequences,
wherein the sequence of glances and corresponding glance information are identified from the one or more eye image sequences based on the extracted visual features.

17. The method of claim 6, wherein each of the one or more eye image sequences correspond to a single individual.

18. The method of claim 17, wherein the one or more eye image sequences in the visual data are captured using one or more cameras.

19. The method of claim 15, wherein, to identify the presence of one or more states at a given instance during the continuous period of time, the method further comprises:
calculating, by the one or more models, respective probabilities of the presence of each of the plurality of candidate states based on model input data; and
selecting, as the identified one or more states, one or more of the plurality of candidate states having the highest respective calculated probabilities of presence at the given instance during the continuous period of time.

20. The method of claim 19, wherein the outputting the feedback includes one or more of:
(1) determining the probability of the presence of each of the plurality of candidate states during the continuous period of time;
(2) determining the identified one or more states having the highest respective calculated probabilities of presence during the continuous period of time; and
(3) providing instructions based on the identified one or more states of the person while engaged in the activity during the continuous period of time.

21. The method of claim 15, further comprising:
identifying one or more glance patterns from among the sequence of glances, based on the classification of each of the sequence of glances and/or the glance transitions of each of the sequence of glances,
wherein the identifying the presence of the one or more states is further based on the glance transition patterns input into each of the one or more models.

22. The method of claim 15, wherein the one or more models are Hidden Markov Models.

23. The method of claim 15, wherein the receiving of the visual data and outputting the result are performed in real-time.

24. The method of claim 15, further comprising:
receiving contextual data from one or more communicatively coupled systems,
wherein the identifying the presence of the one or more states is further based on the contextual data.

25. The method of claim 24, wherein the contextual data includes at least one of environment data, surrounding data, and user data.

26. The method of claim 15, further comprising:
training the one or more models using (1) visual data corresponding to a plurality of people engaging in the activity during continuous periods of time, and (2) state data including one or more states present in the plurality of people while engaging in the activity.

27. A system for managing visual allocation, comprising:
at least one memory; and
at least one processor communicatively coupled to the at least one memory, the at least one processor being operable to:
receive (1) visual data corresponding to a plurality of people engaging in an activity during a continuous period of time, and (2) state data including one or more states present in the plurality of people while engaging in the activity during the continuous period of time;

calculate one or more mathematical structures using the visual data;

train one or more models corresponding to each of the one or more states, based on one or more of the calculated mathematical structures;

store the trained one or more models in the one or more memories; and identify, using the trained one or more models, the presence of at least one of the one or more states using visual data of a person engaging in the activity during a different continuous period of time, wherein the mathematical structures include structures representing glances in the visual data in the context of at least one of glance transitions and glance duration, and wherein the mathematical structures include one or more matrices selected from the group consisting of:
(i) a transition counts matrix;
(ii) a transition probabilities matrix;
(iii) a transition importance mask matrix;
(iv) a transition significance matrix;
(v) a duration counts matrix;
(vi) a time distribution per location percentage matrix;
(vii) a time distribution per transition percentage matrix; and
(viii) a duration importance mask matrix.

28. The system of claim 27, wherein:
the transition counts matrix includes data representing a number of times that the glances in the visual data transition from one glance location to another glance location from among a set of predetermined candidate glance locations;

the transition probabilities matrix includes data representing a relative frequency that each of the glances transition to another candidate glance location, calculated by dividing values of the transition count value matrix by the sum of all values in the respective row;

the transition importance mask matrix includes data calculated by dividing values of the transition counts matrix by the largest value among the values of the respective row;

the transition significance matrix includes data calculated by multiplying the transition probabilities matrix by the transition significance matrix;

the duration counts matrix includes data representing a duration of each of the glances;

the time distribution per location percentage matrix includes data representing an aggregation of the durations of the glances for each of the candidate glance locations, obtained by normalizing the duration counts matrix by candidate glance location;

the time distribution per transition percentage matrix includes data representing the aggregation of the duration of the glances for each of the candidate glance locations relative to all of the candidate glance locations, obtained by normalizing the duration counts matrix by all of the candidate glance locations; and the duration importance mask matrix representing data calculated by normalizing the duration counts matrix to unity.

29. The system of claim 28, wherein the one or more states of the person engaging in the activity during the other continuous period of time is not identified in the visual data of the person.

* * * * *